United States Patent
Yu

(10) Patent No.: US 12,376,072 B2
(45) Date of Patent: *Jul. 29, 2025

(54) PAGING MESSAGE TRANSMISSION METHOD, BASE STATION, AND USER EQUIPMENT

(71) Applicant: Huawei Technologies Co., Ltd., Shenzhen (CN)

(72) Inventor: Zheng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,842

(22) Filed: Oct. 27, 2020

(65) Prior Publication Data

US 2021/0045086 A1   Feb. 11, 2021

Related U.S. Application Data

(63) Continuation of application No. 15/727,884, filed on Oct. 9, 2017, now Pat. No. 10,827,457, which is a
(Continued)

(51) Int. Cl.
*H04W 68/02* (2009.01)
*H04W 68/08* (2009.01)

(52) U.S. Cl.
CPC ......... *H04W 68/02* (2013.01); *H04W 68/025* (2013.01); *H04W 68/08* (2013.01)

(58) Field of Classification Search
CPC ... H04W 68/02; H04W 72/042; H04W 76/14; H04W 48/12; H04W 72/14;
(Continued)

(56) References Cited

U.S. PATENT DOCUMENTS 8,712,448 B2   4/2014  Laroia et al.
10,231,211 B2 *   3/2019  Kim .................... H04L 5/0053
(Continued)

FOREIGN PATENT DOCUMENTS

CN   1771743 A   5/2006
CN   1784076 A   6/2006
(Continued)

OTHER PUBLICATIONS

Anonymous ("LTE Paging Procedure," Internet Archive Wayback Machine, Mar. 17, 2015, 6 pages.) (Year: 2015).*
(Continued)

*Primary Examiner* — Umair Ahsan
(74) *Attorney, Agent, or Firm* — SLATER MATSIL, LLP

(57) ABSTRACT

A paging message transmission method, a base station, and user equipment are provided. The paging message transmission method includes determining indication information included in a first paging message, where the indication information is used to instruct user equipment UE to receive the first paging message and/or receive a second paging message, sending the first paging message including the indication information, where the first paging message is included in a first transport block, and sending the second paging message if the indication information instructs the user equipment to receive the second paging message, where the second paging message is included in a second transport block, and the second transport block and the first transport block are different transport blocks that are separately transmitted.

20 Claims, 7 Drawing Sheets

Related U.S. Application Data continuation of application No. PCT/CN2015/076362, filed on Apr. 10, 2015.

(58) Field of Classification Search
CPC . H04W 74/006; H04W 68/00; H04W 68/025; H04W 68/08
See application file for complete search history.

(56) References Cited

U.S. PATENT DOCUMENTS

| | | | |
|---|---|---|---|
| 10,313,989 B2* | 6/2019 | Kashima | H04W 56/001 |
| 2004/0180675 A1 | 9/2004 | Choi et al. | |
| 2005/0277429 A1 | 12/2005 | Laroia et al. | |
| 2007/0232280 A1 | 10/2007 | Pruser et al. | |
| 2008/0207217 A1 | 8/2008 | Ramanathan et al. | |
| 2008/0280631 A1 | 11/2008 | Lee et al. | |
| 2009/0182871 A1 | 7/2009 | Gupta et al. | |
| 2010/0178895 A1 | 7/2010 | Maeda et al. | |
| 2010/0178942 A1 | 7/2010 | Laroia et al. | |
| 2011/0051668 A1* | 3/2011 | Lee | H04W 72/23 370/328 |
| 2011/0163847 A1* | 7/2011 | Park | H04W 52/0216 340/7.34 |
| 2012/0076085 A1 | 3/2012 | Chou | |
| 2013/0114483 A1 | 5/2013 | Suzuki | |
| 2014/0171092 A1 | 6/2014 | Xu | |
| 2015/0063155 A1 | 3/2015 | Suzuki | |
| 2018/0077722 A1 | 3/2018 | Awad et al. | |
| 2018/0092062 A1 | 3/2018 | Chen | |
| 2018/0288679 A1 | 10/2018 | Hessler et al. | |
| 2019/0082420 A1 | 3/2019 | Yu et al. | |

FOREIGN PATENT DOCUMENTS

| | | | | |
|---|---|---|---|---|
| CN | 1947454 | A | | 4/2007 |
| CN | 101060713 | A | | 10/2007 |
| CN | 101267596 | A | | 9/2008 |
| CN | 101345992 | A | | 1/2009 |
| CN | 101385364 | A | | 3/2009 |
| CN | 101389135 | A | | 3/2009 |
| CN | 101925014 | A * | 12/2010 | ............. H04H 20/28 |
| CN | 102761826 | A | | 10/2012 |
| CN | 104025678 | A | | 9/2014 |
| CN | 104137635 | A | | 11/2014 |
| CN | 107211390 | B | | 7/2020 |
| JP | 2008505591 | A | | 2/2008 |
| JP | 2014078782 | A | | 5/2014 |
| KR | 20140100497 | A | | 8/2014 |
| RU | 2441342 | C2 | | 1/2012 |
| RU | 2010133972 | A | | 2/2012 |
| WO | 2009035282 | A2 | | 3/2009 |
| WO | 2011116849 | A1 | | 9/2011 |

OTHER PUBLICATIONS

"3rd Generation Partnership Project; Technical Specification Group Radio Access Network; Evolved Universal Terrestrial Radio Access (E-UTRA); Physical Channels and Modulation (Release 12)," 3GPP TS 36.211 V12.5.0, Mar. 2015, Technical Specification, 136 pages.

3rd Generation Partnership Project; Technical Specification Group Radio Access Network; Evolved Universal Terrestrial Radio Access (E-UTRA); Multiplexing and Channel Coding (Release 12), 3GPP TS 36.212 V12.4.0, Mar. 2015, Technical Specification, 94 pages.

3rd Generation Partnership Project; Technical Specification Group Radio Access Network; Evolved Universal Terrestrial Radio Access (E-UTRA); Services provided by the physical layer (Release 12), 3GPP TS 36.302 V12.3.0, Mar. 2015, 22 pages.

3rd Generation Partnership Project; Technical Specification Group Radio Access Network;Evolved Universal Terrestrial Radio Access (E-UTRA); Medium Access Control (MAC) protocol specification (Release 12), 3GPP TS 36.321 V12.5.0, Mar. 2015, 78 pages.

3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.5.0, Mar. 2015, 446 pages.

Anonymous, "LTE in Wireless, Paging in LTE," Nov. 2012, 6 pages.

Anonymous:"LTE Paging Procedure," https://web.archive.org/web/20150317082045/http://www.rfwireless-world.com/Tutorials/LTE-paging-procedure.html, Mar. 13, 2015, 5 pages.

Internet Archive Wayback Machine, "LTE Paging Procedure," Mar. 17, 2015, 6 pages.

LG Electronics Inc.,"Transmission of LTE Paging," 3GPP TSG-RAN WG2 #59bis, Shanghai, China, Oct. 8-Oct. 12, 2007, R2-074200, 4 pages.

Kim, Y.J. et al., "A Transmission of Paging Indicator Information for Mobile Communication Systems," 2009 IEEE 20th International Symposium on Personal, Indoor and Mobile Radio Communications, 2009, 4 pages.

Xiaohua Y. et al., "Improvement of the paging success rate caused by Huawei RAC splitting, Mobile Communications," 2011, Issue 10, 5 pages (with English abstract).

"3rd Generation Partnership Project; Technical Specification Group Radio Access Network; Evolved Universal Terrestrial Radio Access (E-UTRA); Radio Resource Control (RRC); Protocol Specification (Release 8)," 3GPP TS 36.331 V8.9.0, Mar. 2010, 211 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.5.0, Technical Specification, Mar. 2015, 251 Pages.

* cited by examiner

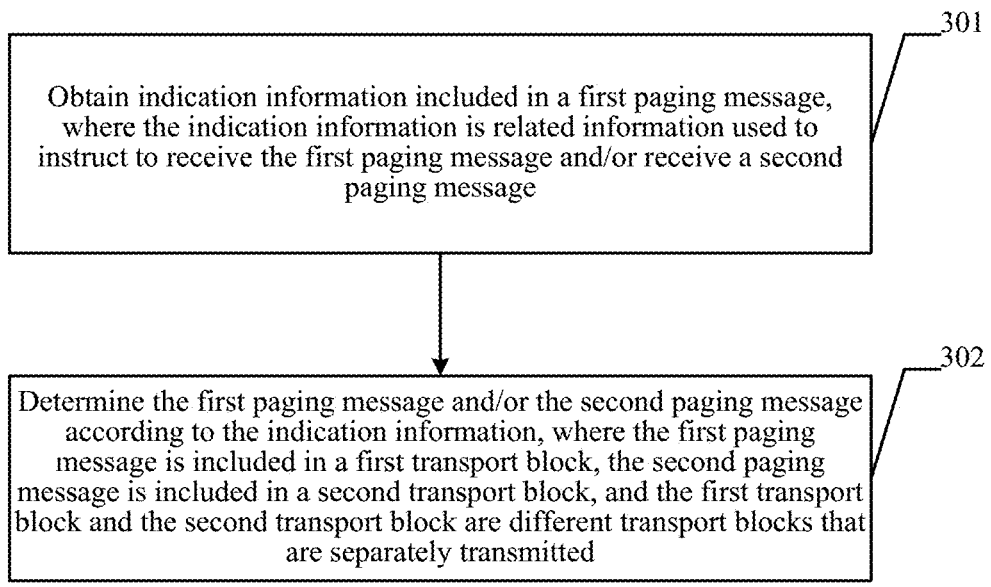
FIG. 3
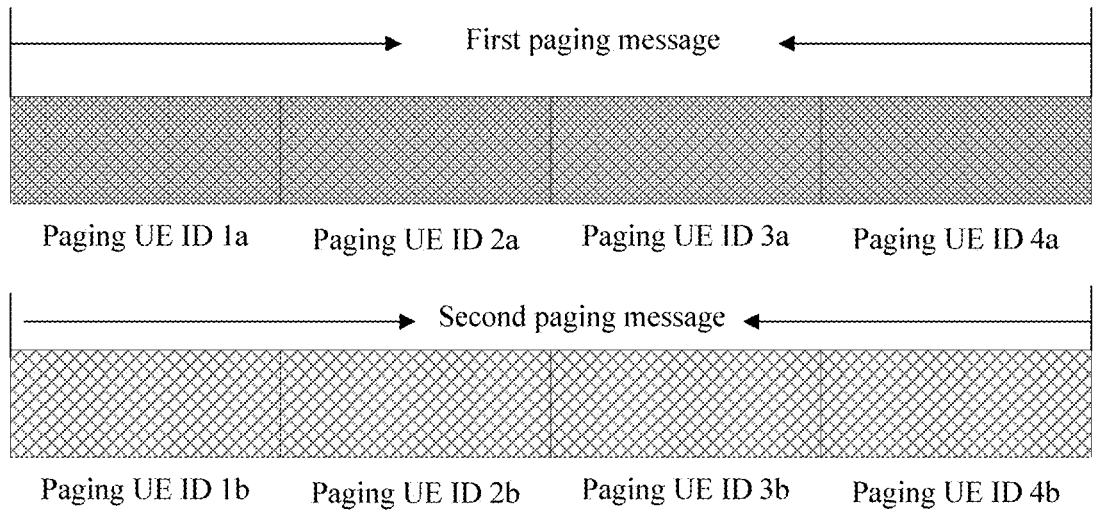
FIG. 4-a

FIG. 4-b

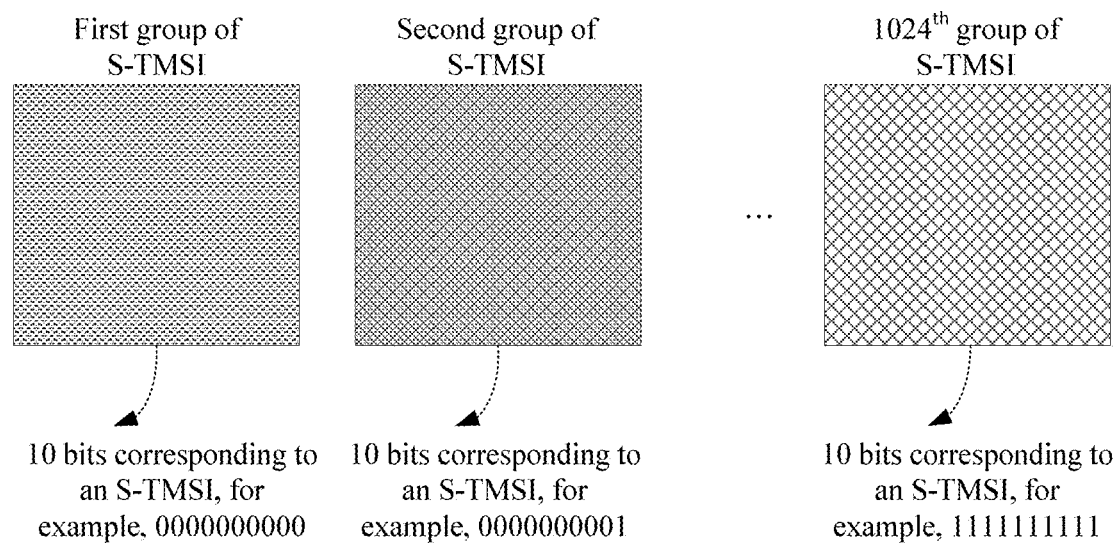
FIG. 4-c
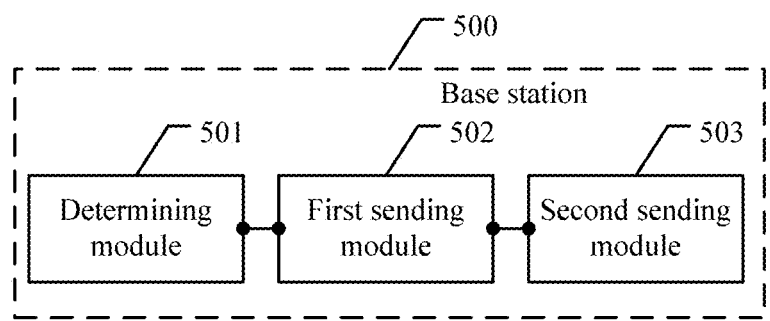
FIG. 5

PAGING MESSAGE TRANSMISSION METHOD, BASE STATION, AND USER EQUIPMENT

CROSS-REFERENCE TO RELATED APPLICATIONS

This application is a continuation of U.S. patent application Ser. No. 15/727,884, filed on Oct. 9, 2017, now U.S. Pat. No. 10,827,457, issuing Nov. 3, 2020, which is a continuation of International Application No. PCT/CN2015/076362, filed on Apr. 10, 2015. All of the afore-mentioned patent applications are hereby incorporated by reference in their entireties.

TECHNICAL FIELD

Embodiments of the present invention relate to the communications field, and in particular, to a paging message transmission method, a base station, and user equipment.

BACKGROUND

In an existing communications system, user equipment (UE) first receives a control channel, determines, according to control information in the received control channel, a size of a transport block (TBS, Transport Block Size) carried on a data channel scheduled by the control channel, and begins to receive data only after the transport block size is determined. For example, in a Long Term Evolution (LTE) system, the control channel may be a physical downlink control channel (PDCCH) or an enhanced physical downlink control channel (EPDCCH), and the data channel may be a physical downlink shared data channel (PDSCH). The user equipment determines, from the PDCCH or the EPDCCH, a size of a transport block TBS carried on the PDSCH. Before the data channel is received, the control channel indicates the TBS of the transport block carried on the data channel. Therefore, a value of the TBS of the transport block carried on the data channel may vary as required.

In the existing LTE system, UE in an idle state needs to listen to a paging message to determine whether a network side or a base station pages the UE. UE in a connected state needs to listen to a paging message to determine whether system information is updated. The paging message sent by the base station to the UE is carried on the data channel, and the data channel is scheduled by the control channel. Therefore, when listening to the paging message, the UE first needs to detect the control channel that schedules the paging message. The data channel that carries the paging message is received according to an instruction of the control channel only after the control channel is successfully detected.

For the UE in an idle state, once the UE successfully detects the data channel that carries the paging message, the UE needs to match a paging UE identity (ID) of the UE with a paging UE ID carried in the paging message. If the matching is successful, that is, the paging UE ID of the UE is the same as one paging UE ID carried in the paging message, the UE determines that the network side or the base station pages the UE. Otherwise, the UE determines that the paging message indicates that the UE is not paged.

A paging message may include one or more paging UE IDs. Therefore, the paging message may be used to page one or more UEs. As described above, the UE can determine, only after successfully detecting the control channel and the paging message scheduled by the control channel, whether the paging message indicates that the UE is paged or whether the paging message indicates an update of the system message. The UE may successfully detect the control channel and the paging message scheduled by the control channel, but discovers that the paging message does not indicate that the UE is paged or the paging message does not indicate an update of the system information. Therefore, there is a problem that power consumption of the UE is wasted. Especially for user equipment with low costs or low complexity, wasted power consumption is crucial.

When coverage is enhanced, the data channel that carries the paging message needs to be repeatedly sent, so as to implement reliable transmission. If transmission of the data channel that carries the paging message still needs to be based on scheduling performed by the control channel, the UE first needs to successfully detect the control channel, and further detects, according to the instruction of the control channel, the data channel that carries the paging message. In this case, to enable the UE to successfully receive the data channel that carries the paging message, the control channel needs to be repeatedly sent, and the data channel that carries the paging message also needs to be repeatedly sent. As a result, system resource overheads are increased, network resource utilization is reduced, and detection complexity and power consumption overheads of the UE are greatly increased.

SUMMARY

Embodiments of the present invention provide a paging message transmission method, a base station, and user equipment, so as to complete transmission of a paging message when no control channel is used to schedule an information transport block, occupy relatively few network resources, and facilitate detection by the user equipment.

According to a first aspect, an embodiment of the present invention provides a paging message transmission method that includes determining indication information included in a first paging message. The indication information is used to instruct user equipment UE to receive the first paging message and/or receive a second paging message. The method further includes sending the first paging message including the indication information. The first paging message is included in a first transport block. The method further includes sending the second paging message if the indication information instructs the user equipment to receive the second paging message, where the second paging message is included in a second transport block, and the second transport block and the first transport block are different transport blocks that are separately transmitted.

With reference to the first aspect, in a first possible implementation of the first aspect, the first paging message includes a paging UE sub-identity ID, multiple sub-IDs corresponding to same UE form a paging UE ID, and the paging UE sub-ID includes some information of the paging UE ID, and/or the second paging message includes another paging UE sub-ID that forms the paging UE ID.

With reference to the first possible implementation of the first aspect, in a second possible implementation of the first aspect, a quantity of paging UE sub-IDs that form the paging UE ID is preset or indicated by signaling, and/or a quantity of paging UE sub-IDs that are included in the first paging message and that are associated with a paging UE ID is preset or indicated by signaling, and/or a quantity of paging UE sub-IDs that are included in the second paging message and that are associated with the paging UE ID is preset or indicated by signaling.

With reference to the first possible implementation of the first aspect, in a third possible implementation of the first aspect, a length of a paging UE sub-ID that forms the paging UE ID is preset or indicated by signaling, and/or a length of a paging UE sub-ID that is included in the first paging message and that is associated with a paging UE ID is preset or indicated by signaling, and/or a length of a paging UE sub-ID that is included in the second paging message and that is associated with the paging UE ID is preset or indicated by signaling.

With reference to the first aspect, or the first, the second, or the third possible implementation of the first aspect, in a fourth possible implementation of the first aspect, the method further includes: determining a format of the first paging message according to a predefinition, or self-determining a format of the first paging message, and notifying a peer device of the determined format of the first paging message by using signaling or an implicit indication.

With reference to the fourth possible implementation of the first aspect, in a fifth possible implementation of the first aspect, the signaling is one or more of the indication information, system information, Radio Resource Control signaling, Media Access Control signaling, or physical layer signaling.

With reference to the first aspect, or the first, the second, the third, the fourth, or the fifth possible implementation of the first aspect, in a sixth possible implementation of the first aspect, the indication information includes one or more of the following information: indication information of an update of system information, indication information of an earthquake and tsunami warning system, or indication information of a commercial mobile alert service.

With reference to the first aspect, or the first, the second, the third, the fourth, the fifth, or the sixth possible implementation of the first aspect, in a seventh possible implementation of the first aspect, the indication information includes setting information indicating a paging UE ID, where the paging UE ID setting information includes one or more of the following information: quantity indication information of an ID whose paging UE ID type is an international mobile subscriber identity IMSI, quantity indication information of an ID whose paging UE ID type is a temporary mobile subscriber identity S-TMSI, value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

With reference to the first aspect, or the first, the second, the third, the fourth, the fifth, the sixth, or the seventh possible implementation of the first aspect, in an eighth possible implementation of the first aspect, the indication information includes one or more of the following information: size information of the second paging message, modulation information of the second paging message, encoding information of the second paging message, time resource information of the second paging message, frequency resource information of the second paging message, power setting information of the second paging message, paging UE ID type information included in the second paging message, paging UE ID quantity information included in the second paging message, or structure information of the second paging message.

With reference to the first aspect, or the first, the second, the third, the fourth, the fifth, the sixth, the seventh, or the eighth possible implementation of the first aspect, in a ninth possible implementation of the first aspect, the second paging message includes indication information, where the indication information in the second paging message is used to indicate the second paging message and/or indicate a third paging message.

With reference to the first aspect, or the first, the second, the third, the fourth, the fifth, the sixth, the seventh, the eighth, or the ninth possible implementation of the first aspect, in a tenth possible implementation of the first aspect, time resource information and/or frequency resource information that are/is used for transmitting the first paging message are/is used to indicate some paging UE IDs or a paging UE sub-ID.

According to a second aspect, an embodiment of the present invention further provides a paging message transmission method, including: obtaining indication information included in a first paging message, where the indication information is related information used to instruct to receive the first paging message and/or receive a second paging message, and determining the first paging message and/or the second paging message according to the indication information, where the first paging message is included in a first transport block, the second paging message is included in a second transport block, and the first transport block and the second transport block are different transport blocks that are separately transmitted.

With reference to the second aspect, in a first possible implementation of the second aspect, the first paging message includes a paging user equipment UE sub-identity ID, multiple sub-IDs corresponding to same UE form a paging UE ID, and the paging UE sub-ID includes some information of the paging UE ID, and/or the second paging message includes another paging UE sub-ID that forms the paging UE ID.

With reference to the first possible implementation of the second aspect, in a second possible implementation of the second aspect, a quantity of paging UE sub-IDs that form the paging UE ID is preset or indicated by signaling, and/or a quantity of paging UE sub-IDs that are included in the first paging message and that are associated with a paging UE ID is preset or indicated by signaling, and/or a quantity of paging UE sub-IDs that are included in the second paging message and that are associated with the paging UE ID is preset or indicated by signaling.

With reference to the first possible implementation of the second aspect, in a third possible implementation of the second aspect, a length of a paging UE sub-ID that forms the paging UE ID is preset or indicated by signaling, and/or a length of a paging UE sub-ID that is included in the first paging message and that is associated with a paging UE ID is preset or indicated by signaling, and/or a length of a paging UE sub-ID that is included in the second paging message and that is associated with the paging UE ID is preset or indicated by signaling.

With reference to the second aspect, or the first, the second, or the third possible implementation of the second aspect, in a fourth possible implementation of the second aspect, the method further includes: determining a format of the first paging message according to a predefinition, or receiving signaling, and determining a format of the first paging message according to the received signaling, or determining a format of the first paging message according to an implicit indication.

With reference to the fourth possible implementation of the second aspect, in a fifth possible implementation of the second aspect, the signaling is one or more of the indication information, system information, Radio Resource Control signaling, Media Access Control signaling, or physical layer signaling.

With reference to the second aspect, or the first, the second, the third, the fourth, or the fifth possible implementation of the second aspect, in a sixth possible implementation of the second aspect, the indication information includes one or more of the following information: indication information of an update of system information, indication information of an earthquake and tsunami warning system, or indication information of a commercial mobile alert service.

With reference to the second aspect, or the first, the second, the third, the fourth, the fifth, or the sixth possible implementation of the second aspect, in a seventh possible implementation of the second aspect, the indication information includes setting information indicating a paging UE ID, where the paging UE ID setting information includes one or more of the following information: quantity indication information of an ID whose paging UE ID type is an international mobile subscriber identity IMSI, quantity indication information of an ID whose paging UE ID type is a temporary mobile subscriber identity S-TMSI, value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

With reference to the second aspect, or the first, the second, the third, the fourth, the fifth, the sixth, or the seventh possible implementation of the second aspect, in an eighth possible implementation of the second aspect, the indication information includes one or more of the following information: size information of the second paging message, modulation information of the second paging message, encoding information of the second paging message, time resource information of the second paging message, frequency resource information of the second paging message, power setting information of the second paging message, paging UE ID type information included in the second paging message, paging UE ID quantity information included in the second paging message, or structure information of the second paging message.

With reference to the second aspect, or the first, the second, the third, the fourth, the fifth, the sixth, the seventh, or the eighth possible implementation of the second aspect, in a ninth possible implementation of the second aspect, the determining the first paging message and/or the second paging message according to the indication information includes: determining, according to the first paging message or the indication information included in the first paging message, one or more of the following content: a transport block size of the second paging message, a structure of the second paging message, or whether the second paging message exists.

With reference to the ninth possible implementation of the second aspect, in a tenth possible implementation of the second aspect, the determining the first paging message and/or the second paging message according to the indication information includes: if there is no paging UE sub-ID matched in the determined first paging message, stopping receiving the second paging message, or if there is a paging UE sub-ID matched in the first paging message, receiving the second paging message.

With reference to the second aspect, or the first, the second, the third, the fourth, the fifth, the sixth, the seventh, the eighth, the ninth, or the tenth possible implementation of the second aspect, in an eleventh possible implementation of the second aspect, the second paging message includes indication information, where the indication information in the second paging message is used to indicate the second paging message and/or indicate a third paging message.

With reference to the second aspect, or the first, the second, the third, the fourth, the fifth, the sixth, the seventh, the eighth, the ninth, the tenth, or the eleventh possible implementation of the second aspect, in a twelfth possible implementation of the second aspect, the determining the first paging message and/or the second paging message according to the indication information includes: determining some paging UE IDs or a paging UE sub-ID by using time resource information and/or frequency resource information that are/is used for transmitting the first paging message.

According to a third aspect, an embodiment of the present invention further provides a base station, including: a determining module, configured to determine indication information included in a first paging message, where the indication information is used to instruct user equipment UE to receive the first paging message and/or receive a second paging message, a first sending module, configured to send the first paging message including the indication information, where the first paging message is included in a first transport block, and a second sending module, configured to send the second paging message if the indication information instructs the user equipment to receive the second paging message, where the second paging message is included in a second transport block, and the second transport block and the first transport block are different transport blocks that are separately transmitted.

With reference to the third aspect, in a first possible implementation of the third aspect, the first paging message includes a paging UE sub-identity ID, multiple sub-IDs corresponding to same UE form a paging UE ID, and the paging UE sub-ID includes some information of the paging UE ID, and/or the second paging message includes another paging UE sub-ID that forms the paging UE ID.

With reference to the first possible implementation of the third aspect, in a second possible implementation of the third aspect, a quantity of paging UE sub-IDs that form the paging UE ID is preset or indicated by signaling, and/or a quantity of paging UE sub-IDs that are included in the first paging message and that are associated with a paging UE ID is preset or indicated by signaling, and/or a quantity of paging UE sub-IDs that are included in the second paging message and that are associated with the paging UE ID is preset or indicated by signaling.

With reference to the first possible implementation of the third aspect, in a third possible implementation of the third aspect, a length of a paging UE sub-ID that forms the paging UE ID is preset or indicated by signaling, and/or a length of a paging UE sub-ID that is included in the first paging message and that is associated with a paging UE ID is preset or indicated by signaling, and/or a length of a paging UE sub-ID that is included in the second paging message and that is associated with the paging UE ID is preset or indicated by signaling.

With reference to the third aspect, or the first, the second, or the third possible implementation of the third aspect, in a fourth possible implementation of the third aspect, the determining module is configured to: determine a format of the first paging message according to a predefinition, or self-determine a format of the first paging message, and then the first sending module notifies a peer device of the determined format of the first paging message by using signaling or an implicit indication.

With reference to the fourth possible implementation of the third aspect, in a fifth possible implementation of the third aspect, the signaling is one or more of the indication information, system information, Radio Resource Control signaling, Media Access Control signaling, or physical layer signaling.

With reference to the third aspect, or the first, the second, the third, the fourth, or the fifth possible implementation of the third aspect, in a sixth possible implementation of the third aspect, the indication information includes one or more of the following information: indication information of an update of system information, indication information of an earthquake and tsunami warning system, or indication information of a commercial mobile alert service.

With reference to the third aspect, or the first, the second, the third, the fourth, the fifth, or the sixth possible implementation of the third aspect, in a seventh possible implementation of the third aspect, the indication information includes setting information indicating a paging UE ID, where the paging UE ID setting information includes one or more of the following information: quantity indication information of an ID whose paging UE ID type is an international mobile subscriber identity (IMSI), quantity indication information of an ID whose paging UE ID type is a temporary mobile subscriber identity (S-TMSI), value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

With reference to the third aspect, or the first, the second, the third, the fourth, the fifth, the sixth, or the seventh possible implementation of the third aspect, in an eighth possible implementation of the third aspect, the indication information includes one or more of the following information: size information of the second paging message, modulation information of the second paging message, encoding information of the second paging message, time resource information of the second paging message, frequency resource information of the second paging message, power setting information of the second paging message, paging UE ID type information included in the second paging message, paging UE ID quantity information included in the second paging message, or structure information of the second paging message.

With reference to the third aspect, or the first, the second, the third, the fourth, the fifth, the sixth, the seventh, or the eighth possible implementation of the third aspect, in a ninth possible implementation of the third aspect, the second paging message includes indication information, where the indication information in the second paging message is used to indicate the second paging message and/or indicate a third paging message.

With reference to the third aspect, or the first, the second, the third, the fourth, the fifth, the sixth, the seventh, the eighth, or the ninth possible implementation of the third aspect, in a tenth possible implementation of the third aspect, time resource information and/or frequency resource information that are/is used for transmitting the first paging message are/is used to indicate some paging UE IDs or a paging UE sub-ID.

According to a fourth aspect, an embodiment of the present invention further provides user equipment, including: an obtaining module, configured to obtain indication information included in a first paging message, where the indication information is related information used to instruct to receive the first paging message and/or receive a second paging message, and a determining module, configured to determine the first paging message and/or the second paging message according to the indication information, where the first paging message is included in a first transport block, the second paging message is included in a second transport block, and the first transport block and the second transport block are different transport blocks that are separately transmitted.

With reference to the fourth aspect, in a first possible implementation of the fourth aspect, the first paging message includes a paging user equipment UE sub-identity ID, multiple sub-IDs corresponding to same UE form a paging UE ID, and the paging UE sub-ID includes some information of the paging UE ID, and/or the second paging message includes another paging UE sub-ID that forms the paging UE ID.

With reference to the first possible implementation of the fourth aspect, in a second possible implementation of the fourth aspect, a quantity of paging UE sub-IDs that form the paging UE ID is preset or indicated by signaling, and/or a quantity of paging UE sub-IDs that are included in the first paging message and that are associated with a paging UE ID is preset or indicated by signaling, and/or a quantity of paging UE sub-IDs that are included in the second paging message and that are associated with the paging UE ID is preset or indicated by signaling.

With reference to the first possible implementation of the fourth aspect, in a third possible implementation of the fourth aspect, a length of a paging UE sub-ID that forms the paging UE ID is preset or indicated by signaling, and/or a length of a paging UE sub-ID that is included in the first paging message and that is associated with a paging UE ID is preset or indicated by signaling, and/or a length of a paging UE sub-ID that is included in the second paging message and that is associated with the paging UE ID is preset or indicated by signaling.

With reference to the fourth aspect, or the first, the second, or the third possible implementation of the fourth aspect, in a fourth possible implementation of the fourth aspect, the determining module is further configured to: determine a format of the first paging message according to a predefinition, or receive signaling, and determine a format of the first paging message according to the received signaling, or determine a format of the first paging message according to an implicit indication.

With reference to the fourth possible implementation of the fourth aspect, in a fifth possible implementation of the fourth aspect, the signaling is one or more of the indication information, system information, Radio Resource Control signaling, Media Access Control signaling, or physical layer signaling.

With reference to the fourth aspect, or the first, the second, the third, the fourth, or the fifth possible implementation of the fourth aspect, in a sixth possible implementation of the fourth aspect, the indication information includes one or more of the following information: indication information of an update of system information, indication information of an earthquake and tsunami warning system, or indication information of a commercial mobile alert service.

With reference to the fourth aspect, or the first, the second, the third, the fourth, the fifth, or the sixth possible implementation of the fourth aspect, in a seventh possible implementation of the fourth aspect, the indication information includes setting information indicating a paging UE ID, where the paging UE ID setting information includes one or more of the following information: quantity indication information of an ID whose paging UE ID type is an international mobile subscriber identity (IMSI), quantity indication information of an ID whose paging UE ID type is a temporary mobile subscriber identity (S-TMSI), value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

With reference to the fourth aspect, or the first, the second, the third, the fourth, the fifth, the sixth, or the seventh possible implementation of the fourth aspect, in an eighth possible implementation of the fourth aspect, the indication information includes one or more of the following information: size information of the second paging message, modulation information of the second paging message, encoding information of the second paging message, time resource information of the second paging message, frequency resource information of the second paging message, power setting information of the second paging message, paging UE ID type information included in the second paging message, paging UE ID quantity information included in the second paging message, or structure information of the second paging message.

With reference to the fourth aspect, or the first, the second, the third, the fourth, the fifth, the sixth, the seventh, or the eighth possible implementation of the fourth aspect, in a ninth possible implementation of the fourth aspect, the determining module is specifically configured to determine, according to the first paging message or the indication information included in the first paging message, one or more of the following content: a transport block size of the second paging message, a structure of the second paging message, or whether the second paging message exists.

With reference to the ninth possible implementation of the fourth aspect, in a tenth possible implementation of the fourth aspect, the obtaining module is specifically configured to: if there is no paging UE sub-ID matched in the determined first paging message, stop receiving the second paging message, or if there is a paging UE sub-ID matched in the first paging message, receive the second paging message.

With reference to the fourth aspect, or the first, the second, the third, the fourth, the fifth, the sixth, the seventh, the eighth, the ninth, or the tenth possible implementation of the fourth aspect, in an eleventh possible implementation of the fourth aspect, the second paging message includes indication information, where the indication information in the second paging message is used to indicate the second paging message and/or indicate a third paging message.

With reference to the fourth aspect, or the first, the second, the third, the fourth, the fifth, the sixth, the seventh, the eighth, the ninth, the tenth, or the eleventh possible implementation of the fourth aspect, in a twelfth possible implementation of the fourth aspect, the determining module is specifically configured to determine some paging UE IDs or a paging UE sub-ID by using time resource information and/or frequency resource information that are/is used for transmitting the first paging message.

It can be learnt from the foregoing technical solutions that the embodiments of the present invention have the following advantages.

In the embodiments of the present invention, indication information included in a first paging message is first determined, where the indication information is used to instruct user equipment (UE) to receive the first paging message and/or receive a second paging message, the first paging message including the indication information is sent, where the first paging message is included in a first transport block, and if the indication information instructs the user equipment to receive the second paging message, the second paging message is sent, where the second paging message is included in a second transport block, and the second transport block and the first transport block are different transport blocks that are separately transmitted. When the indication information included in the first paging message indicates the second paging message, the second paging message is also sent. The first paging message and the second paging message are separately transmitted by using different transport blocks, and the first paging message that is first transmitted may be used to indicate the second paging message that is transmitted next. According to the first paging message that is first received, a terminal may receive the second paging message that is transmitted next. No control channel needs to be used to schedule a transport block, and a transport block size of a paging message can be changed flexibly. Therefore, relatively few network resources are occupied, detection of a control channel by user equipment is avoided, and detection power consumption of the user equipment is reduced.

BRIEF DESCRIPTION OF THE DRAWINGS

FIG. 3 is a schematic block diagram of a procedure for another paging message transmission method according to an embodiment of the present invention;

FIG. 4-b is a composition structure diagram of another paging message according to an embodiment of the present invention;

FIG. 4-c is a schematic diagram of indications for S-TMSIs according to an embodiment of the present invention;

FIG. 5 is a schematic composition structure diagram of a base station according to an embodiment of the present invention;

DETAILED DESCRIPTION OF ILLUSTRATIVE EMBODIMENTS

Embodiments of the present invention provide a paging message transmission method, a base station, and user equipment, so as to complete transmission of a paging message when no control channel is used to schedule an information transport block, occupy relatively few network resources, and facilitate detection by the user equipment.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely some rather than all of the embodiments of the present invention. All other embodiments obtained by persons skilled in the art based on the embodiments of the present invention shall fall within the protection scope of the present invention.

[owl] In the specification, claims, and accompanying drawings of the present invention, the terms "first", "second", and so on are intended to distinguish between similar objects but do not necessarily indicate a specific order or sequence. It should be understood that the terms used in such a way are interchangeable in proper circumstances, which is merely a distinguishing manner that is used when objects having a same attribute are described in the embodiments of the present invention. In addition, the terms "include", "contain" and any other variants mean to cover a non-exclusive inclusion, so that a process, method, system, product, or device that includes a series of units is not necessarily limited to those units, but may include other units not expressly listed or inherent to such a process, method, system, product, or device.

A system architecture to which the paging message transmission method in the present invention is applied is first described briefly. The present invention is mainly applied to an LTE system or a Long Term Evolution Advanced (LTE-A, LTE Advanced) system. The present invention may also be applied to another communications system, for example, a Wideband Code Division Multiple Access (WCDMA) or Time Division-Synchronous Code Division Multiple Access (TD-SCDMA) system, provided that there is an entity that can send information in the communications system and there is another entity that can receive information in the communications system. For example, the information is a paging message.

Figure 1:
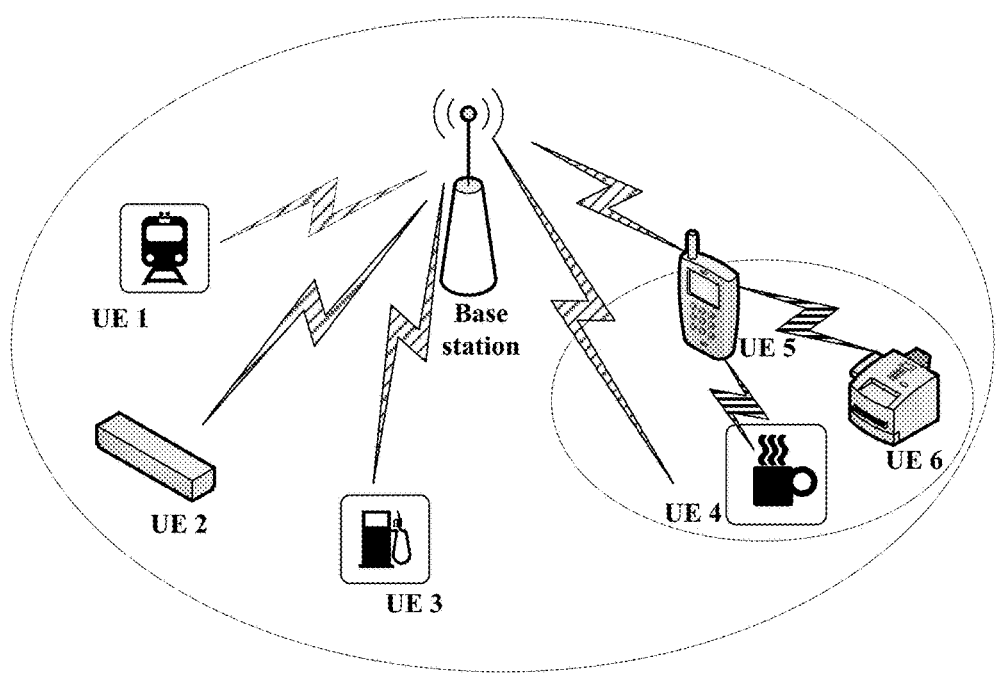
FIG. 1 is a system architecture diagram of a communications system to which a paging message transmission method is applied according to the present invention.

Referring to FIG. 1, FIG. 1 is a system architecture diagram of a communications system to which a paging message transmission method is applied according to the present invention. As shown in FIG. 1, a base station and user equipment (UE) 1 to UE 6 form a communications system. In the communications system, the user equipment may be referred to as a terminal, and the base station sends an RAR message to one or more of the UE 1 to the UE 6. The base station is a transmit-end device in the paging message transmission method of the present invention, and the UE 1 to the UE 6 are receive-end devices in the paging message transmission method of the present invention. In addition, the UE 4 to the UE 6 also form a communications system. In the communications system, the UE 5 may be implemented as a function of the base station, and the UE 5 may send an RAR message to one or more of the UE 4 to the UE 6.

The following separately provides descriptions in detail.

Figure 2:
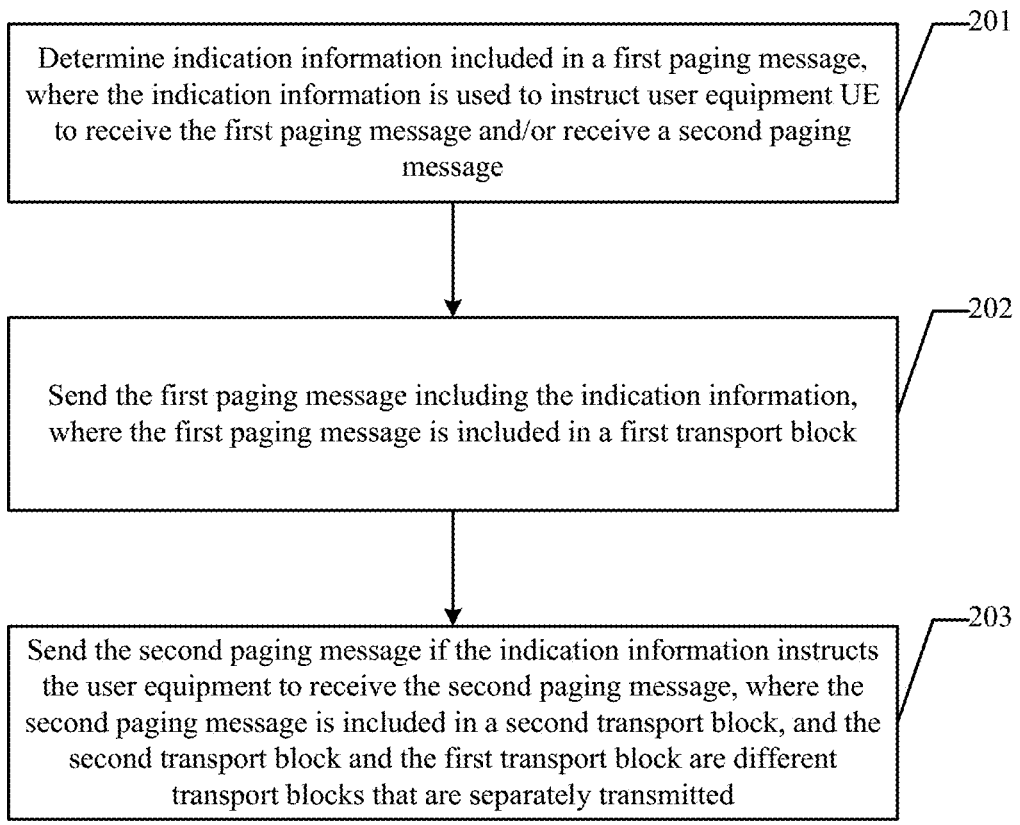
FIG. 2 is a schematic block diagram of a procedure for a paging message transmission method according to an embodiment of the present invention.

An embodiment of the paging message transmission method in the present invention may be applied to paging message sending by a base station. Referring to FIG. 2, the paging message transmission method may include the following steps.

201. Determine indication information included in a first paging message, where the indication information is used to instruct user equipment UE to receive the first paging message and/or receive a second paging message.

In this embodiment of the present invention, UE in an idle state needs to listen to a paging message to determine whether a network side or the base station pages the UE. UE in a connected state needs to listen to a paging message to determine whether system information is updated. A paging message sent by the base station to UE is carried on a data channel. The base station no longer performs scheduling by using a control channel, but adds indication information in the paging message. A transport block that is used by the base station to send the paging message may be indicated by the indication information, and the UE no longer needs to detect the control channel, so that power consumption of the UE is reduced.

In this embodiment of the present invention, when sending the first paging message to the UE, the base station needs to add the indication information in the first paging message. The indication information is used to instruct the UE to receive the first paging message and/or the second paging message. The indication information determined by the base station indicates whether the UE receives a paging message and which paging message is to be received.

202. Send the first paging message including the indication information, where the first paging message is included in a first transport block.

In this embodiment of the present invention, the base station determines the indication information included in the first paging message, and the base station sends the first paging message including the indication information. Specifically, the base station may transmit the first paging message by using the first transport block. In this case, the terminal first obtains the indication information, and the terminal completes receiving of the first paging message according to the indication information. Further, if the indication information indicates the second paging message, the terminal may further receive the second paging message.

203. Send the second paging message if the indication information instructs the user equipment to receive the second paging message, where the second paging message is included in a second transport block, and the second transport block and the first transport block are different transport blocks that are separately transmitted.

In this embodiment of the present invention, after the base station sends the first paging message, if the base station further generates the second paging message, the base station may indicate, in the indication information, that the second paging message also exists, and the base station transmits the second paging message by using the second transport block. It should be noted that the second transport block and the first transport block are two transport blocks that are separately transmitted. The base station first transmits the first transport block, and then transmits the second transport block. Each transport block is separately transmitted, that is, either of the two transport blocks is separately sent to a peer device (that is, the UE). Separate transmission of transport blocks may enable the peer device to receive the transport blocks one by one. Paging messages carried in different transport blocks are different. Different transport blocks may be separately transmitted. For example, encoding and/or rate matching, and mapping are performed separately for different transport blocks.

To reduce power consumption used by the UE to detect a paging message, the base station may divide an identity (ID) of the UE that needs to be paged into two or more paging UE sub-IDs for implementation. The first paging message includes a paging UE sub-identity ID, multiple sub-IDs corresponding to same UE form a paging UE ID, and the paging UE sub-ID includes some information of the paging UE ID, and/or the second paging message includes another paging UE sub-ID that forms the paging UE ID. That is, a paging UE ID is divided into two paging UE sub-IDs, where each paging UE sub-ID includes some information of the paging UE ID, and the two paging UE sub-IDs obtained by means of division are respectively carried in the first paging message and the second paging message. Similar to this implementation, another implementation may be: A paging UE ID is divided into three paging UE sub-IDs, where two paging UE sub-IDs are carried in the first paging message, and the other paging UE sub-ID is carried in the second paging message. Similarly, a paging UE ID may alternatively be divided into four paging UE sub-IDs, where two paging UE IDs are carried in the first paging message, and the other two paging UE IDs are carried in the second paging message.

In other embodiments of the present invention, a quantity of paging UE sub-IDs may be determined in one of the following manners: a quantity of paging UE sub-IDs that form a paging UE ID is preset or indicated by signaling, and/or a quantity of paging UE sub-IDs that are included in the first paging message and that are associated with a paging UE ID is preset or indicated by signaling, and/or a quantity of paging UE sub-IDs that are included in the second paging message and that are associated with the paging UE ID is preset or indicated by signaling.

A quantity of sub-IDs divided from a paging UE ID may be preset or indicated by signaling. For example, the base station first determines a quantity of paging UE sub-IDs according to a predefinition, where the quantity of paging UE sub-IDs may be specified by a system, or may be specified by an upper-layer device of the base station, for example, specified by an MME. Both the base station and the terminal determine the quantity of paging UE sub-IDs according to the predefinition. For another example, the base station first receives signaling, where the signaling originates from a system or an entity such as a Mobility Management Entity (MME). The base station determines a quantity of paging UE sub-IDs according to the received signaling. Further, after the quantity of sub-IDs divided from the paging UE ID is determined, for all sub-IDs that form the paging UE ID, a quantity of sub-IDs carried in the first paging message and a quantity of sub-IDs carried in the second paging message may be preset or indicated by signaling. For example, a quantity of sub-IDs carried in a paging message may be preset by the system, or may be determined by the base station by using the signaling received from the system. For example, z indicates a quantity of all sub-IDs of a paging UE ID, x indicates a quantity of paging UE sub-IDs carried in the first paging message, and y indicates a quantity of paging UE sub-IDs carried in the second paging message. In this case, z=x+y, where a value of z is invariable, and values of x and y may be preset or indicated by signaling.

In other embodiments of the present invention, a length of a paging UE sub-ID may be determined in one of the following manners: a length of a paging UE sub-ID that forms a paging UE ID is preset or indicated by signaling, and/or a length of a paging UE sub-ID that is included in the first paging message and that is associated with a paging UE ID is preset or indicated by signaling, and/or a length of a paging UE sub-ID that is included in the second paging message and that is associated with the paging UE ID is preset or indicated by signaling.

A length of a sub-ID divided from a paging UE ID may be preset or indicated by signaling. For example, the base station first determines a length of a paging UE sub-ID according to a predefinition, where the length of the paging UE sub-ID may be specified by a system, or may be specified by an upper-layer device of the base station, for example, specified by an MME. Both the base station and the terminal determine the length of the paging UE sub-ID according to the predefinition. For another example, the base station first receives signaling, where the signaling originates from a system or an entity such as an MME. The base station determines a length of a paging UE sub-ID according to the received signaling. Further, for all sub-IDs that form the paging UE ID, which sub-ID of a given length is carried in the first paging message and which sub-ID of a given length is carried in the second paging message may be preset or indicated by signaling. For example, which sub-ID of a given length is carried in a paging message may be preset by the system, or may be determined by the base station by using the signaling received from the system.

In other embodiments of the present invention, a format of the first paging message sent by the base station in step 202 may be determined in one of the following manners. Specifically, the paging message transmission method provided in this embodiment of the present invention may further include one of the following steps: A1: determining the format of the first paging message according to a predefinition, or A2: self-determining the format of the first paging message, and notifying a peer device of the determined format of the first paging message by using signaling or an implicit indication If the base station needs to determine the format of the first paging message, the base station may determine the format of the first paging message in either of the manners in steps A1 and A2. For example, the base station first determines the format of the first paging message according to the predefinition. The format of the first paging message may be specified by a system, or may be specified by an upper-layer device of the base station, for example, specified by an MME. Both the base station and the terminal determine the format of the first paging message according to the predefinition. For another example, the base station may set the format of the first paging message by itself, and notifies the peer device (for example, the terminal) after self-determining the format of the first paging message. The self-determined format of the first paging message can satisfy a requirement of the base station itself. The format of the first paging message may be determined according to a resource transmission status of the base station itself. For example, the base station may determine the format of the first paging message according to bandwidth, or determine the format of the first paging message according to whether the base station is currently in an idle state or a busy state.

Further, in an implementation scenario of step A2, the signaling sent by the base station may be one or more of the indication information carried in the first paging message, system information, Radio Resource Control signaling, Media Access Control signaling, or physical layer signaling. In other words, the signaling of which the base station notifies, in step A2, the peer device for use may be the indication information or the system information, or the signaling may be specifically the Radio Resource Control signaling, the Media Access Control signaling, or the physical layer signaling. A specific signaling format for use may be determined according to an application scenario, and is not limited herein.

In some embodiments of the present invention, the indication information carried in the first paging message includes one or more of the following information: indication information of an update of system information, indication information of an earthquake and tsunami warning system (ETWS), or indication information of a commercial mobile alert service (CMAS). A specific signaling format for use may be determined according to an application scenario, and is not limited herein.

In some embodiments of the present invention, the indication information may further indicate a setting manner of a paging UE ID in a paging message, that is, the indication information includes setting information indicating a paging UE ID. The paging UE ID setting information includes one or more of the following information: quantity indication information of an ID whose paging UE ID type is an international mobile subscriber identity (IMSI), quantity indication information of an ID whose paging UE ID type is a temporary mobile subscriber identity (S-TMSI, SAE Temporary Mobile Station Identifier), value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

In some embodiments of the present invention, the indication information may further indicate the second paging message. Specifically, the indication information included in the first paging message includes one or more of the following information: size information of the second paging message, modulation information of the second paging message, encoding information of the second paging message, time resource information of the second paging message, frequency resource information of the second paging message, power setting information of the second paging message, paging UE ID type information included in the second paging message, paging UE ID quantity information included in the second paging message, or structure information of the second paging message.

In other embodiments of the present invention, the first paging message includes the indication information, and the second paging message may also include indication information. The indication information in the second paging message is used to indicate the second paging message and/or indicate a third paging message. That is, if the base station generates the second paging message and the third paging message, the indication information may be added in the second paging message, where the indication information is used to indicate the third paging message. A structure and content of the indication information herein may be similar to those of the indication information carried in the first paging message, and reference may be made to the description of the indication information in the foregoing embodiment. Details are not described herein again.

In some embodiments of the present invention, a paging UE ID included in the first paging message may be indicated by other information carried in the first paging message. For example, time resource information and/or frequency resource information that are/is used for transmitting the first paging message may be used to indicate some paging UE IDs or a paging UE sub-ID. For example, a paging UE ID may include three sub-IDs. The first sub-ID may be indicated by the time resource information and/or the frequency resource information that are/is used for transmitting the first paging message, and the second sub-ID and the third sub-ID may be respectively carried in the indication information in the first paging message and the second paging message. According to the method, overheads of a paging message can be reduced, so that system resource utilization is improved and power consumption used by the UE to detect a paging message is reduced. In other words, the UE can parse time resource information and frequency resource information to obtain some paging UE IDs, and the UE does not need to determine a paging UE ID additionally, so that power consumption of the UE is reduced.

It can be learnt from the description of the foregoing embodiment of the present invention, indication information included in a first paging message is first determined, where the indication information is used to instruct user equipment UE to receive the first paging message and/or receive a second paging message, the first paging message including the indication information is sent, where the first paging message is included in a first transport block, and if the indication information instructs the user equipment to receive the second paging message, the second paging message is sent, where the second paging message is included in a second transport block, and the second transport block and the first transport block are different transport blocks that are separately transmitted. When the indication information included in the first paging message indicates the second paging message, the second paging message is also sent. The first paging message and the second paging message are separately transmitted by using different transport blocks, and the first paging message that is first transmitted may be used to indicate the second paging message that is transmitted next. According to the first paging message that is first received, a terminal may receive the second paging message that is transmitted next. No control channel needs to be used to schedule a transport block, and a transport block size of a paging message can be changed flexibly. Therefore, relatively few network resources are occupied, detection of a control channel by user equipment is avoided, and detection power consumption of the user equipment is reduced.

In the foregoing embodiment, the paging message transmission method is described from a perspective of a base station side. The following describes, from a perspective of a peer device (a terminal) of a base station, a paging message transmission method provided in the present invention. Referring to FIG. 3, the paging message transmission method according to another embodiment of the present invention may include the following steps.

301. Obtain indication information included in a first paging message, where the indication information is related information used to instruct to receive the first paging message and/or receive a second paging message.

In this embodiment of the present invention, UE in an idle state needs to listen to a paging message to determine whether a network side or the base station pages the UE. UE in a connected state needs to listen to a paging message to determine whether system information is updated. A paging message sent by the base station to UE is carried on a data channel. The base station no longer performs scheduling by using a control channel, but adds indication information in the paging message. A transport block that is used by the base station to send the paging message may be indicated by the indication information, and the UE no longer needs to detect the control channel, so that power consumption of the UE is reduced. [moo] In this embodiment of the present invention, when sending the first paging message to the UE, the base station needs to add the indication information in the first paging message. The indication information is used to instruct the UE to receive the first paging message and/or the second paging message. Therefore, the UE first needs to obtain the indication information included in the first paging message, and the UE determines, according to the indication information, whether to receive a paging message and which paging message is to be received. The base station no longer schedules the transport block by using the control channel, and an indication for the paging message sent by the base station to the terminal is obtained by the UE by parsing the indication information.

302. Determine the first paging message and/or the second paging message according to the indication information, where the first paging message is included in a first transport block, the second paging message is included in a second transport block, and the first transport block and the second transport block are different transport blocks that are separately transmitted.

In this embodiment of the present invention, after the UE determines the indication information included in the first paging message, the UE receives the first paging message according to the indication information. The UE obtains the first paging message from the first transport block, and if the indication information indicates the second paging message, the UE may further obtain the second paging message from the second transport block. It should be noted that the second transport block and the first transport block are two transport blocks that are separately transmitted. The base station first transmits the first transport block, and then transmits the second transport block. Each transport block is separately transmitted, that is, either of the two transport blocks is separately sent to the peer device (that is, the UE). Separate transmission of transport blocks may enable the peer device to receive the transport blocks one by one. Paging messages carried in different transport blocks are different. Different transport blocks may be separately transmitted. For example, decoding and/or rate matching, and mapping are performed separately for different transport blocks.

To reduce power consumption used by the UE to detect a paging message, the base station may divide an identity (ID) of the UE that needs to be paged into two or more paging UE sub-IDs for implementation. The first paging message includes a paging UE sub-identity ID, multiple sub-IDs corresponding to same UE form a paging UE ID, and the paging UE sub-ID includes some information of the paging UE ID, and/or the second paging message includes another paging UE sub-ID that forms the paging UE ID. That is, a paging UE ID is divided into two paging UE sub-IDs, where each paging UE sub-ID includes some information of the paging UE ID, and the two paging UE sub-IDs obtained by means of division are respectively carried in the first paging message and the second paging message. Similar to this implementation, another implementation may be: A paging UE ID is divided into three paging UE sub-IDs, where two paging UE IDs are carried in the first paging message, and the other paging UE sub-ID is carried in the second paging message. Similarly, a paging UE ID may alternatively be divided into four paging UE sub-IDs, where two paging UE IDs are carried in the first paging message, and the other two paging UE IDs are carried in the second paging message.

In other embodiments of the present invention, a quantity of paging UE sub-IDs may be determined in one of the following manners: a quantity of paging UE sub-IDs that form a paging UE ID is preset or indicated by signaling, and/or a quantity of paging UE sub-IDs that are included in the first paging message and that are associated with a paging UE ID is preset or indicated by signaling, and/or a quantity of paging UE sub-IDs that are included in the second paging message and that are associated with the paging UE ID is preset or indicated by signaling.

A quantity of sub-IDs divided from a paging UE ID may be preset or indicated by signaling. For example, the UE first determines a quantity of paging UE sub-IDs according to a predefinition, where the quantity of paging UE sub-IDs may be specified by a system, or may be specified by an upper-layer device of the base station, for example, specified by an MME. The UE determines the quantity of paging UE sub-IDs according to the predefinition. For another example, the UE first receives signaling, where the signaling originates from the base station, a system, an MME, or the like. The UE determines a quantity of paging UE sub-IDs according to the received signaling. Further, after the quantity of sub-IDs divided from the paging UE ID is determined, for all sub-IDs that form the paging UE ID, a quantity of sub-IDs carried in the first paging message and a quantity of sub-IDs carried in the second paging message may be preset or indicated by signaling. For example, a quantity of sub-IDs carried in a paging message may be preset by the system, or may be determined by the UE by using the signaling received from the base station. For example, z indicates a quantity of all sub-IDs of a paging UE ID, x indicates a quantity of paging UE sub-IDs carried in the first paging message, and y indicates a quantity of paging UE sub-IDs carried in the second paging message. In this case, z=x+y, where a value of z is invariable, and values of x and y may be preset or indicated by signaling.

In other embodiments of the present invention, a length of a paging UE sub-ID may be determined in one of the following manners: a length of a paging UE sub-ID that forms a paging UE ID is preset or indicated by signaling, and/or a length of a paging UE sub-ID that is included in the first paging message and that is associated with a paging UE ID is preset or indicated by signaling, and/or a length of a paging UE sub-ID that is included in the second paging message and that is associated with the paging UE ID is preset or indicated by signaling.

A length of a sub-ID divided from a paging UE ID may be preset or indicated by signaling. For example, the UE first determines a length of a paging UE sub-ID according to a predefinition, where the length of the paging UE sub-ID may be specified by a system, specified by an upper-layer device of the base station, or indicated by signaling from the base station. The UE determines the length of the paging UE sub-ID according to the predefinition. For another example, the UE first receives signaling, where the signaling originates from the base station. The UE determines a length of a paging UE sub-ID according to the received signaling. Further, for all sub-IDs that form the paging UE ID, which sub-ID of a given length is carried in the first paging message and which sub-ID of a given length is carried in the second paging message may be preset or indicated by signaling. For example, which sub-ID of a given length is carried in a paging message may be preset by a system, or may be determined by the UE by using the signaling received from the base station.

In other embodiments of the present invention, a format of the first paging message determined by the UE according to the indication information in step 302 may be determined in one of the following manners. Specifically, the paging message transmission method provided in this embodiment of the present invention may further include one of the following steps: B1: determining the format of the first paging message according to a predefinition, or B2: receiving signaling, and determining the format of the first paging message according to the received signaling, or B3: determining the format of the first paging message according to an implicit indication.

If the UE needs to determine the format of the first paging message, the UE may determine the format of the first paging message in any one of the manners in steps B1, B2 and B3. For example, the UE first determines the format of the first paging message according to the predefinition. The format of the first paging message may be specified by a system, or may be specified by an upper-layer device of the base station, for example, specified by an MME. The UE determines the format of the first paging message according to the predefinition. For another example, the UE receives signaling sent by the base station. The base station self-determines the format of the first paging message, and notifies the peer device (for example, the terminal) after self-determining the format of the first paging message. The self-determined format of the first paging message can satisfy a requirement of the base station itself. The format of the first paging message may be determined according to a resource transmission status of the base station itself. For still another example, the UE may obtain the format of the first paging message according to the implicit indication. For example, the UE determines the format of the first paging message from a new field used in existing information.

Further, in an implementation scenario of step B2, the signaling sent by the base station may be one or more of the indication information carried in the first paging message, system information, Radio Resource Control signaling, Media Access Control signaling, or physical layer signaling. In other words, the signaling of which the base station notifies, in step B2, the peer device for use may be the indication information or the system information, or the signaling may be specifically the Radio Resource Control signaling, the Media Access Control signaling, or the physical layer signaling. A specific signaling format for use may be determined according to an application scenario, and is not limited herein.

In some embodiments of the present invention, the indication information carried in the first paging message includes one or more of the following information: indication information of an update of system information, indication information of an earthquake and tsunami warning system (ETWS), or indication information of a commercial mobile alert service (CMAS). A specific signaling format for use may be determined according to an application scenario, and is not limited herein.

In some embodiments of the present invention, the indication information may further indicate a setting manner of a paging UE ID in a paging message, that is, the indication information includes setting information indicating a paging UE ID. The paging UE ID setting information includes one or more of the following information: quantity indication information of an ID whose paging UE ID type is an IMSI, quantity indication information of an ID whose paging UE ID type is an S-TMSI, value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

In some embodiments of the present invention, the indication information may further indicate the second paging message. Specifically, the indication information included in the first paging message includes one or more of the following information: size information of the second paging message, modulation information of the second paging message, encoding information of the second paging message, time resource information of the second paging message, frequency resource information of the second paging message, power setting information of the second paging message, paging UE ID type information included in the second paging message, paging UE ID quantity information included in the second paging message, or structure information of the second paging message.

In other embodiments of the present invention, the first paging message includes the indication information, and the second paging message may also include indication information. The indication information in the second paging message is used to indicate the second paging message and/or indicate a third paging message. That is, if the base station generates the second paging message and the third paging message, the indication information may be added in the second paging message, where the indication information is used to indicate the third paging message. A structure and content of the indication information herein may be similar to those of the indication information carried in the first paging message, and reference may be made to the description of the indication information in the foregoing embodiment. Details are not described herein again.

In some embodiments of the present invention, the determining the first paging message and/or the second paging message according to the indication information in step 302 may specifically include the following step: determining, according to the first paging message or the indication information included in the first paging message, one or more of the following content: a transport block size of the second paging message, a structure of the second paging message, or whether the second paging message exists.

Specifically, after obtaining the indication information included in the first paging message, according to the indication information included in the first paging message, the UE may determine whether the second paging message exists, and further determine the transport block size and the structure of the second paging message when determining that the second paging message exists. In this way, the UE receives the second paging message according to the determined transport block size of the second paging message.

In some embodiments of the present invention, the determining the first paging message and/or the second paging message according to the indication information in step 302 may specifically include the following step: if there is no paging UE sub-ID matched in the determined first paging message, stopping receiving the second paging message, or if there is a paging UE sub-ID matched in the first paging message, receiving the second paging message.

Specifically, the UE first detects a paging UE sub-ID in the first paging message. If the sub-ID does not match a paging UE sub-ID of the UE, it indicates that the base station has not sent a paging message to the UE. A paging UE sub-ID in the first paging message is first detected. If the sub-ID matches a paging UE sub-ID of the UE, it indicates that the UE needs to perform further detection. In this case, the UE needs to receive the second paging message according to the indication information in the first paging message, and obtain another paging UE sub-ID from the second paging message. If the another sub-ID also matches the sub-ID of the UE, it indicates that the base station has sent a paging message to the UE. If there is a paging UE sub-ID matched in the determined first paging message, and there is no paging UE sub-ID matched in the determined second paging message, it is determined that the UE is not paged.

Alternatively, if there is a paging UE sub-ID matched in the determined first paging message, and there is a paging UE sub-ID matched in the determined second paging message, it is determined that the UE is paged.

In some embodiments of the present invention, a paging UE ID included in the first paging message may be indicated by other information carried in the first paging message. For example, time resource information and/or frequency resource information that are/is used for transmitting the first paging message may be used to indicate some paging UE IDs or a paging UE sub-ID. For example, a paging UE ID may include three sub-IDs. The first sub-ID may be indicated by the time resource information and/or the frequency resource information that are/is used for transmitting the first paging message, and the second sub-ID and the third sub-ID may be respectively carried in the indication information in the first paging message and the second paging message. According to the method, overheads of a paging message can be reduced, so that system resource utilization is improved and power consumption used by the UE to detect a paging message is reduced. In other words, the UE can parse time resource information and frequency resource information to obtain some paging UE IDs, and the UE does not need to determine a paging UE ID additionally, so that power consumption of the UE is reduced.

It can be learnt from the description of the foregoing embodiment of the present invention, indication information included in a first paging message is first obtained, where the indication information is related information used to instruct to receive the first paging message and/or receive a second paging message, and the first paging message and/or the second paging message are/is determined according to the indication information, where the first paging message is included in a first transport block, the second paging message is included in a second transport block, and the first transport block and the second transport block are different transport blocks that are separately transmitted. When the indication information included in the first paging message indicates the second paging message, the second paging message is also sent. The first paging message and the second paging message are separately transmitted by using different transport blocks, and the first paging message that is first transmitted may be used to indicate the second paging message that is transmitted next. According to the first paging message that is first received, a terminal may receive the second paging message that is transmitted next. No control channel needs to be used to schedule a transport block, and a transport block size of a paging message can be changed flexibly. Therefore, relatively few network resources are occupied, detection of a control channel by user equipment is avoided, and detection power consumption of the user equipment is reduced.

For better understanding and implementation of the foregoing solutions in the embodiments of the present invention, the following provides a detailed description by using a corresponding application scenario as an example.

A transport block size of the first paging message is preset, preconfigured, or indicated by signaling. For example, the transport block size of the first paging message is indicated by system information. The transport block size of the first paging message is preset or preconfigured. Therefore, the UE determines the transport block size of the first paging message when receiving the first paging message, and then receives the first paging message.

The transport block size of the second paging message is variable, preset, indicated by the first paging message, or determined according to the first paging message. Because the transport block size of the second paging message is variable, a size of the second paging message can be flexibly adjusted, so as to adjust a paging capacity adaptively.

In this embodiment of the present invention, a paging message includes information about one or more paging UE IDs. Particularly, the paging message may alternatively be an empty message.

In this embodiment of the present invention, a paging UE ID may include multiple paging UE sub-IDs. That is, a paging UE sub-ID includes some information of the paging UE ID. Particularly, a paging UE sub-ID may be equivalent to the paging UE ID, or a paging UE sub-ID is empty. For example, a paging UE ID 1=(a paging UE ID 1a, a paging UE ID 1b, a paging UE ID 1c) holds true. Herein, a comma in the bracket represents a cascading relationship.

More specifically, it is assumed that a length of a paging UE ID is 40 bits, and the paging UE ID may include two paging UE sub-IDs. For example, a length of each paging UE sub-ID is 20 bits. For another example, a length of a paging UE ID is 40 bits, and the paging UE ID may include three paging UE sub-IDs. A length of a paging UE sub-ID is 15 bits, a length of another paging UE sub-ID is 15 bits, and a length of the other sub-ID is 10 bits.

A quantity of paging UE sub-IDs that form the paging UE ID and a length of a paging UE sub-ID may be preset, preconfigured, or indicated by indication information. For example, the indication information in the first paging message indicates the length of the paging UE sub-ID and/or the quantity of paging UE sub-IDs that form the paging UE ID.

The UE always listens to a paging message at a determined time point (such as a radio frame and/or a radio subframe), but actually in most cases, a paging message that the UE listens to does not indicate that the UE is paged. That is, the UE wastes a lot of power consumption in listening to a paging message indicating that the UE is not paged. Especially when coverage is enhanced, the paging message needs to be repeatedly transmitted. Therefore, power consumption overheads are larger. In view of this, the UE may first listen to a smaller message, where the message carries some information of the paging UE ID (that is, a paging UE sub-ID). The UE first detects this smaller message. If discovering that some information of the paging UE ID does not match an ID (or a paging UE sub-ID) of the UE, the UE determines that the base station or the network side does not page the UE. In this case, the UE stops receiving a paging message, so that power consumption of the UE is greatly reduced. If discovering that some information of the paging UE ID matches a paging UE ID (or a paging UE sub-ID) of the UE, the UE determines that the base station or the network side may page the UE. In this case, the UE needs to continue receiving a paging message, so as to determine whether the base station or the network side indeed pages the UE.

Figure 4:
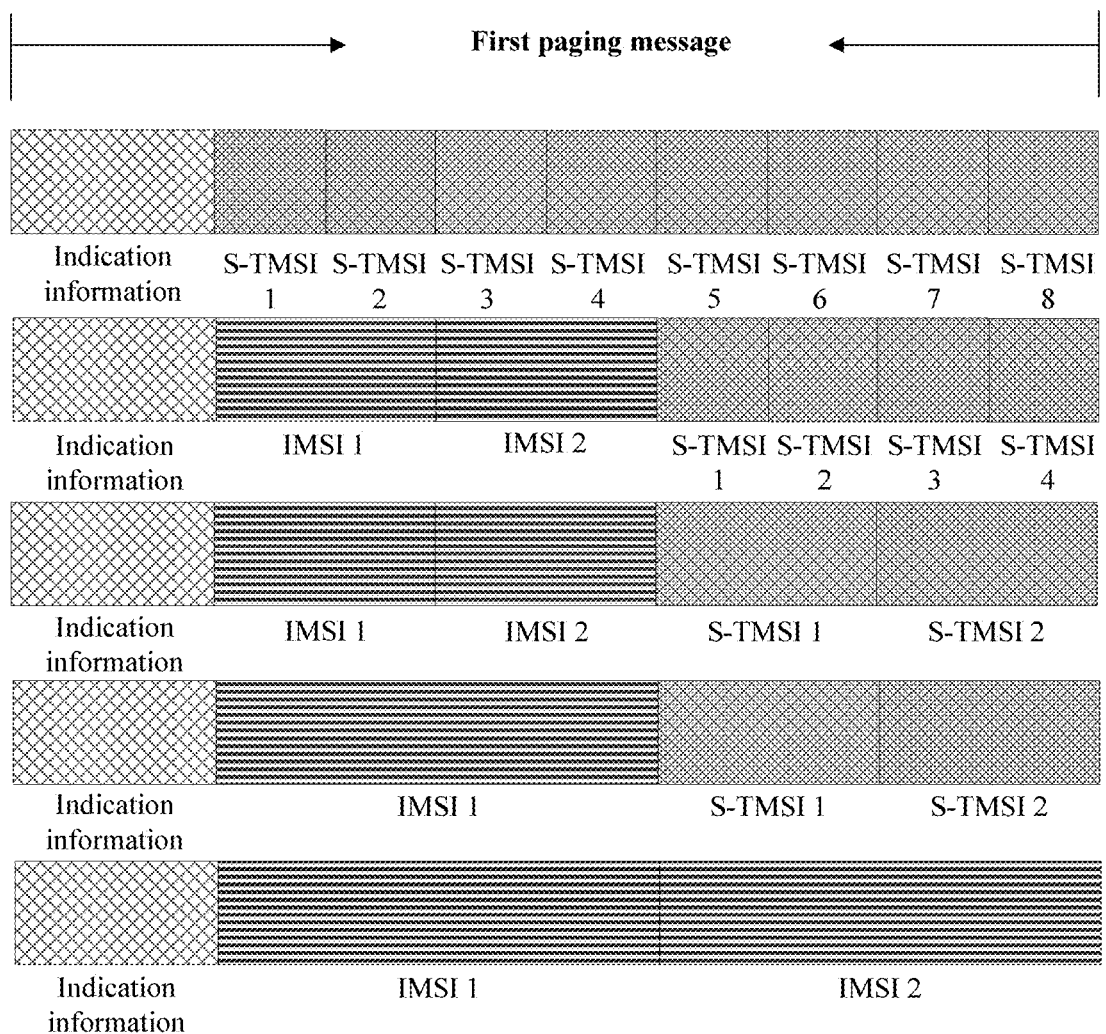
FIG. 4-a is a composition structure diagram of a paging message according to an embodiment of the present invention.

The first paging message may have one or more formats. A system or standard may predefine a format used by the first paging message. Alternatively, the base station (or the system) indicates the format of the first paging message by using an explicit or implicit method. For example, the format of the first paging message is indicated by the indication information in the first paging message. Referring to FIG. 4-a, FIG. 4-a is a schematic composition diagram of a paging message according to an embodiment of the present invention. Each paging UE ID includes two paging UE sub-IDs. The first paging message carries first paging UE sub-IDs of four UEs, and the second paging message carries second paging UE sub-IDs of the four UEs. A paging UE ID 1 includes an ID 1a and an ID 1b, a paging UE ID 2 includes an ID 2a and an ID 2b, a paging UE ID 3 includes an ID 3a and an ID 3b, and a paging UE ID 4 includes an ID 4a and an ID 4b. The ID 1a, the ID 2a, the ID 3a, and the ID 4a are carried in the first paging message, and the ID 1b, the ID 2b, the ID 3b, and the ID 4b are carried in the second paging message.

The UE first receives the first paging message. If discovering that a paging UE sub-ID carried in the first paging message matches a first paging UE sub-ID in the paging UE ID of the UE, the UE determines that the paging message sent by the base station may indicate that the UE is paged. Further, the UE detects the second paging message, where the second paging message carries a second paging UE sub-ID of the foregoing paging UE ID. If a paging UE sub-ID carried in the second paging message matches a second paging UE sub-ID in the paging UE ID of the UE, the UE determines that the base station pages the UE. Otherwise, the UE determines that the base station or the network side does not page the UE.

If the UE discovers that there is no paging UE sub-ID, in the first paging message, that matches a first paging UE sub-ID in the paging UE ID of the UE, the UE determines that the base station or the network side does not page the UE. In this case, the UE stops receiving the second paging message, so that complexity of detecting a paging message by the UE is reduced, and power consumption of the UE is reduced.

Specifically, for example, a paging UE ID of UE 1 is the paging UE ID 1, and the paging UE ID 1 includes the paging UE ID 1a and the paging UE ID 1b. If the base station or the network side pages the UE 1, the first paging message carries the paging UE ID 1a, and the second paging message carries the paging UE ID 1b. The UE 1 first detects the first paging message. If the UE 1 discovers that the first paging message includes the paging UE ID 1a, the UE 1 determines that the base station or the network side may page the UE. Further, the UE 1 first detects the second paging message. If the UE 1 discovers that the second paging message includes the paging UE ID 1b, the UE 1 determines that the base station or the network side pages the UE. If the UE 1 discovers that the second paging message does not include the paging UE ID 1b, the UE 1 determines that the base station or the network side does not page the UE. Certainly, if the UE 1 discovers that the first paging message does not include the paging UE ID 1a, the UE 1 determines that the base station or the network side does not page the UE.

To indicate an update of system information for UE in a connected state, the indication information in the first paging message may include information indicating an update of system information. For example, the first paging message may include system update information (systemInfoModification). If there is system update information, the UE determines that the system information is updated (or the system information may be updated, or some system information is updated).

Optionally, there are many types of paging UE IDs, and lengths of different types of paging UE IDs may be different. In the first paging message, to flexibly support different types of paging UE IDs, the indication information in the first paging message may indicate paging UE ID setting or configuration information. The transport block size of the first paging message is determined, and therefore the first paging message with the determined size may indicate different types of paging UE IDs. In addition, the transport block size of the first paging message is determined, and therefore paging UEs of a variable quantity (that is, a quantity of UEs that are paged as indicated by the first paging message is variable) is supported in the first paging message with the determined size, so as to implement flexible system design.

For example, if an IMSI is twice a length of an S-TMSI, a paging bit length of UE whose UE ID type is an IMSI can support paging of two UEs whose paging UE ID type is an S-TMSI. In addition, generally, an IMSI is rarely used as a paging UE ID. However, in some scenarios, only an IMSI can be used to page UE. Therefore, for a paging message, a case in which a paging UE ID is an IMSI also needs to be supported. In this case, the base station needs to indicate, to the UE, whether a paging UE ID in use is an S-TMSI or an IMSI. Moreover, the base station may further indicate a quantity of UEs whose paging UE ID is based on an S-TMSI, and a quantity of UEs whose paging UE ID is based on an IMSI.

For example, it is assumed that a size of the first paging message is 120 bits and only a paging UE sub-ID based on an S-TMSI is included in the first paging message. If a length of each paging UE sub-ID is 20 bits, the first paging message may include paging UE sub-IDs of 6 UEs, that is, the first paging message may be used to initiate paging to 6 UEs. If a length of each paging UE sub-ID is 10 bits, the first paging message may include paging UE sub-IDs of 12 UEs, that is, the first paging message may be used to initiate paging to 12 UEs. In this way, a quantity of UEs to be paged can be adjusted adaptively while the size of the first paging message remains the same, so as to satisfy a paging message capacity requirement of a network.

In addition, the indication information in the first paging message may indicate paging UE ID (or paging UE sub-ID) setting (or configuration) information. For example, the paging UE ID setting (or configuration) information includes one or more of the following information: quantity indication information of an ID whose paging UE ID type is an IMSI, quantity indication information of an ID whose paging UE ID type is an S-TMSI, value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

It should be noted that other information in the present invention may be an empty message, and in this case, a message structure of the first paging message excludes the other information. If another message is not an empty message, the first paging message further includes the another message.

The following provides a specific embodiment of the first paging message.

It is assumed that M bits in the indication information are used for S-TMSI setting. The M bits may be used for one or more of the following settings: quantity indication information of an ID whose paging UE ID type is an S-TMSI, value indication information of a paging UE sub-ID whose type is an S-TMSI, location indication information of a paging UE sub-ID whose type is an S-TMSI, or indication information of a paging UE ID type. For example, it is assumed that two bits are used for S-TMSI setting. Referring to Table 1, Table 1 lists a relationship between two bits and S-TMSI setting. A length in the table may be measured in units of bits, decimal numbers, or octal bytes.

| Bit status for S-TMSI setting | Length of a paging UE sub-ID whose type is an S-TMSI in the first paging message |
| --- | --- |
| 00 | A |
| 01 | B |
| 10 | C |
| 11 | D |

It is assumed that N bits in the indication information are used for IMSI setting. The N bits may be used for one or more of the following settings: quantity indication information of a paging UE ID whose paging UE ID type is an IMSI, location indication information of a paging UE sub-ID whose type is an S-TMSI, or value indication information of a paging UE sub-ID whose type is an IMSI.

One or more of an independent indication, a combination indication, or a bitmap indication may be used to perform S-TMSI setting or IMSI setting. The independent indication means that one field indicates one piece of specific indication information. The combination indication means that one field indicates multiple pieces of specific indication information. The bitmap indication means that each bit in one field indicates specific indication information. Certainly, there may alternatively be K bits for combination setting performed on S-TMSI setting and IMSI setting. Details are not described herein.

Referring to the following Table 2, the following table lists IMSI setting by using three bits. One bit is used for a value indication of a paging UE sub-ID whose type is an IMSI, and the other two bits are used for a quantity indication of a paging UE ID whose type is an IMSI. Optionally, a value of the paging UE sub-ID whose type is an IMSI may be invariable or preset. In this way, the indication information no longer needs to indicate the value of the paging UE sub-ID whose type is an IMSI.

|  | Bit status | Value |
| --- | --- | --- |
| Value indication of a paging UE sub-ID whose type is an IMSI | 0 | A |
|  | 1 | B |
| Quantity indication of a paging UE ID whose type is an IMSI | 00 | a |
|  | 01 | b |
|  | 10 | c |
|  | 11 | d |

A location, in the first paging message, of a field that carries indication information and/or a size of the field may be invariable or preset. For example, a field that indicates the indication information in the first paging message is at the first (or the last) location of the first paging message. Because the indication information in the first paging message includes one or more types of indication information, locations, in the field that indicates the indication information in the first paging message, of bits or fields indicating different types of indication information and/or sizes of bits or fields may also be invariable or preset.

If the first paging message includes a paging UE ID (or a paging UE sub-ID) whose type is an IMSI, a location, in the first paging message, of the paging UE ID whose type is an IMSI is invariable or predefined. For example, it is predefined that the paging UE ID whose type is an IMSI follows (or precedes) the field of the indication information. A bit length, occupied in the first paging message, of the paging UE ID whose type is an IMSI is determined by a quantity of paging UE IDs whose type is an IMSI and the length of the paging UE ID whose type is an IMSI. Similarly, a location, in the first paging message, of the paging UE ID whose type is an IMSI may also be defined.

If the first paging message includes both a paging UE ID (or a paging UE sub-ID) whose type is an IMSI and a paging UE ID (or a paging UE sub-ID) whose type is an S-TMSI, a location relationship between the paging UE ID (or the paging UE sub-ID) whose type is an IMSI and the paging UE ID (or the paging UE sub-ID) whose type is an S-TMSI is invariable or predefined. For example, the paging UE ID (or the paging UE sub-ID) whose type is an IMSI always precedes the paging UE ID (or the paging UE sub-ID) whose type is an S-TMSI. Alternatively, the first paging UE ID (or the first paging UE sub-ID) whose type is an S-TMSI follows the last paging UE ID (or the last paging UE sub-ID) whose type is an IMSI.

Referring to FIG. 4-b, FIG. 4-b is a schematic composition diagram of another paging message according to an embodiment of the present invention. FIG. 4-b illustrates different structures of the first paging message while the transport block size remains the same. For example, it is assumed that the size of the transport block that carries the first paging message is 168 bits. The indication information occupies eight bits.

In a first structure shown in FIG. 4-b, the first paging message includes the indication information and eight paging UE sub-IDs whose type is an S-TMSI. A length of each paging UE sub-ID whose type is an S-TMSI is 20 bits.

In a second structure shown in FIG. 4-b, the first paging message includes the indication information, two paging UE sub-IDs whose type is an IMSI, and four paging UE sub-IDs whose type is an S-TMSI. A length of each paging UE sub-ID whose type is an IMSI is 40 bits, and a length of each paging UE sub-ID whose type is an S-TMSI is 20 bits.

In a third structure shown in FIG. 4-b, the first paging message includes the indication information, two paging UE sub-IDs whose type is an IMSI, and two paging UE sub-IDs whose type is an S-TMSI. A length of each paging UE sub-ID whose type is an IMSI is 40 bits, and a length of each paging UE sub-ID whose type is an S-TMSI is 40 bits.

In a fourth structure shown in FIG. 4-b, the first paging message includes the indication information, one paging UE sub-ID whose type is an IMSI, and two paging UE sub-IDs whose type is an S-TMSI. A length of the paging UE sub-ID whose type is an IMSI is 80 bits, and a length of each paging UE sub-ID whose type is an S-TMSI is 40 bits.

In a fifth structure shown in FIG. 4-b, the first paging message includes the indication information and two paging UE sub-IDs whose type is an IMSI. A length of each paging UE sub-ID whose type is an IMSI is 80 bits.

The indication information may indicate one or more of the following: a length of a paging UE sub-ID whose type is an IMSI, a quantity of paging UE sub-IDs whose type is an IMSI, a length of a paging UE sub-ID whose type is an S-TMSI, or a quantity of paging UE sub-IDs whose type is an S-TMSI.

As described above, after receiving the first paging message, the UE needs to determine whether to receive the second paging message and/or whether the second paging message exists. If the UE needs to receive the second paging message, the UE needs to determine the transport block size of the second paging message and/or the structure of the second paging message. The UE may determine, according to the first paging message, the transport block size of the second paging message, and/or the structure of the second paging message, and/or whether the second paging message exists.

For example, the indication information in the first paging message may include one or more of the following: size information of the second paging message, modulation information of the second paging message, encoding information of the second paging message, time resource information of the second paging message, frequency resource information of the second paging message, power setting information of the second paging message, a paging UE ID type included in the second paging message, a paging UE ID quantity included in the second paging message, or the structure of the second paging message. Alternatively, the UE implicitly determines, according to the indication information in the first paging message, the transport block size of the second paging message, and/or the structure of the second paging message, and/or whether the second paging message exists.

The following describes a second paging message corresponding to the first paging message shown in FIG. 4-b. A first type of second paging message includes eight paging UE sub-IDs whose type is an S-TMSI. A second type of second paging message includes four paging UE sub-IDs whose type is an S-TMSI. There is no second paging message corresponding to the first paging messages of the third to the fifth structures.

Certainly, the second paging message may alternatively include indication information. A specific usage and composition of the indication information are similar to those described above. Details are not described herein again. Certainly, the indication information in the second paging message can only be used to indicate the second paging message and/or indicate a third paging message, and the like.

The second paging message may alternatively have a different message structure. For example, the second paging message includes only first information, where a length (or a size) of the first information is indicated by the first paging message or determined according to the first paging message. For another example, the second paging message includes only first information and second information, where the first information is the same as described previously, and the second information is determined according to the indication information in the first paging message. For still another example, the second paging message includes at least first information, second information, and indication information, where the first information and the second information are the same as the foregoing descriptions. It should be noted that some information of the indication information in the present invention may be predefined or preset.

In addition, to reduce overheads of a paging message, a paging UE ID of a smaller length may be used. Alternatively, some paging UE ID (or paging UE sub-ID) information is implicitly carried by using time resource information and/or frequency resource information that are/is used for transmitting a paging message. Other paging UE ID information may be indicated to the UE by using signaling.

For example, a time point of a paging frame of the UE and/or a time point of a paging occasion of the UE are/is determined according to a UE ID, and the UE ID is determined according to an IMSI. For example, the UE ID is equal to IMSI mod 1024. However, the base station only receives UE ID information sent by a mobility management entity, and the base station cannot obtain valid paging UE ID information according to the UE ID information.

If the time point of the paging frame of the UE and/or the time point of the paging occasion of the UE are/is determined according to the UE ID, and the UE ID is determined according to a paging UE ID, the UE ID or the time point of the paging frame of the UE and/or the time point of the paging occasion of the UE may reflect some information of the paging UE ID. Referring to FIG. 4-c, FIG. 4-c is a schematic diagram of indications for S-TMSIs according to an embodiment of the present invention. It is assumed that the paging UE ID is an S-TMSI of 40 bits. If all of 2^40 S-TMSIs are divided into 1024 groups, a time point of a paging frame of the UE and/or a time point of a paging occasion of the UE are/is related to a group ID, that is, a group ID to which a UE ID belongs, where the UE ID is equal to an S-TMSI. In this case, 10 bits of an S-TMSI are in effect determined according to the time point of the paging frame and/or the time point of the paging occasion. The remaining 30-bit S-TMSI may be transmitted to the UE by using signaling or a paging message. The UE only needs to detect a paging message at the time point of the paging frame of the UE and/or at the time point of the paging occasion of the UE that are/is determined by the paging UE ID of the UE, to check whether the 30 bits in an ID in the paging message match 30 bits in the paging UE ID of the UE. If the matching is successful, the paging message indicates that the UE is paged. Otherwise, the paging message does not indicate that the UE is paged. According to the method, overheads of a paging message can be reduced, so that system resource utilization is improved and power consumption used by the UE to detect a paging message is reduced. Apparently, the method for reducing overheads of a paging message may be used in combination with the foregoing paging message transmission method, so as to transmit a paging message more effectively and reduce power consumption of UE in a better way.

It should be noted that, for ease of description, each foregoing method embodiment is described as a combination of a series of actions. However, persons skilled in the art should know that the present invention is not limited by the described action sequence, because some steps may be performed in another sequence or simultaneously according to the present invention. In addition, persons skilled in the art should also appreciate that all the embodiments described in the specification are preferred embodiments, and the related actions and modules are not necessarily mandatory to the present invention.

For ease of better implementing the foregoing solutions in the embodiments of the present invention, the following further provides related apparatuses for implementing the foregoing solutions.

Referring to FIG. 5, an embodiment of the present invention provides a base station 500. The base station 500 may include a determining module 501, a first sending module 502, and a second sending module 503.

The determining module 501 is configured to determine indication information included in a first paging message, where the indication information is used to instruct user equipment UE to receive the first paging message and/or receive a second paging message.

The first sending module 502 is configured to send the first paging message including the indication information, where the first paging message is included in a first transport block.

The second sending module 503 is configured to send the second paging message if the indication information instructs the user equipment to receive the second paging message, where the second paging message is included in a second transport block, and the second transport block and the first transport block are different transport blocks that are separately transmitted.

In some embodiments of the present invention, the first paging message includes a paging UE sub-identity ID, multiple sub-IDs corresponding to same UE form a paging UE ID, and the paging UE sub-ID includes some information of the paging UE ID, and/or the second paging message includes another paging UE sub-ID that forms the paging UE ID.

In some embodiments of the present invention, a quantity of paging UE sub-IDs that form the paging UE ID is preset or indicated by signaling, and/or a quantity of paging UE sub-IDs that are included in the first paging message and that are associated with a paging UE ID is preset or indicated by signaling, and/or a quantity of paging UE sub-IDs that are included in the second paging message and that are associated with the paging UE ID is preset or indicated by signaling.

In some embodiments of the present invention, a length of a paging UE sub-ID that forms the paging UE ID is preset or indicated by signaling, and/or, a length of a paging UE sub-ID that is included in the first paging message and that is associated with a paging UE ID is preset or indicated by signaling, and/or a length of a paging UE sub-ID that is included in the second paging message and that is associated with the paging UE ID is preset or indicated by signaling.

In some embodiments of the present invention, the determining module 501 is configured to: determine a format of the first paging message according to a predefinition, or self-determine a format of the first paging message, and then the first sending module notifies a peer device of the determined format of the first paging message by using signaling or an implicit indication.

In some embodiments of the present invention, the signaling is one or more of the indication information, system information, Radio Resource Control signaling, Media Access Control signaling, or physical layer signaling.

In some embodiments of the present invention, the indication information includes one or more of the following information: indication information of an update of system information, indication information of an earthquake and tsunami warning system, or indication information of a commercial mobile alert service.

In some embodiments of the present invention, the indication information includes setting information indicating a paging UE ID, where the paging UE ID setting information includes one or more of the following information: quantity indication information of an ID whose paging UE ID type is an international mobile subscriber identity IMSI, quantity indication information of an ID whose paging UE ID type is a temporary mobile subscriber identity S-TMSI, value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

In some embodiments of the present invention, the indication information includes one or more of the following information: size information of the second paging message, modulation information of the second paging message, encoding information of the second paging message, time resource information of the second paging message, frequency resource information of the second paging message, power setting information of the second paging message, paging UE ID type information included in the second paging message, paging UE ID quantity information included in the second paging message, or structure information of the second paging message.

In some embodiments of the present invention, the second paging message includes indication information, where the indication information in the second paging message is used to indicate the second paging message and/or indicate a third paging message.

In some embodiments of the present invention, time resource information and/or frequency resource information that are/is used for transmitting the first paging message are/is used to indicate some paging UE IDs or a paging UE sub-ID.

It can be learnt from the description of the foregoing embodiment of the present invention, indication information included in a first paging message is first obtained, where the indication information is related information used to instruct to receive the first paging message and/or receive a second paging message, and the first paging message and/or the second paging message are/is determined according to the indication information, where the first paging message is included in a first transport block, the second paging message is included in a second transport block, and the first transport block and the second transport block are different transport blocks that are separately transmitted. When the indication information included in the first paging message indicates the second paging message, the second paging message is also sent. The first paging message and the second paging message are separately transmitted by using different transport blocks, and the first paging message that is first transmitted may be used to indicate the second paging message that is transmitted next. According to the first paging message that is first received, a terminal may receive the second paging message that is transmitted next. No control channel needs to be used to schedule a transport block, and a transport block size of a paging message can be changed flexibly. Therefore, relatively few network resources are occupied, detection of a control channel by user equipment is avoided, and detection power consumption of the user equipment is reduced.

Figure 6:
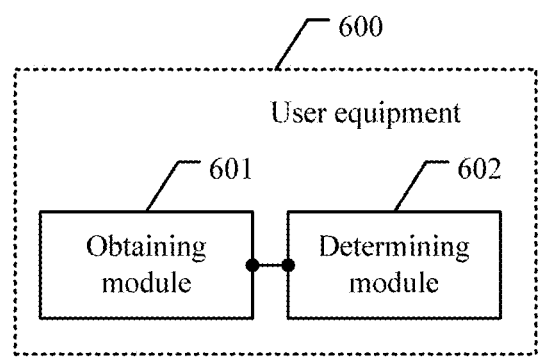
FIG. 6 is a schematic composition structure diagram of user equipment according to an embodiment of the present invention.

Referring to FIG. 6, an embodiment of the present invention provides user equipment 600. The user equipment 600 may include an obtaining module 601 and a determining module 602.

The obtaining module 601 is configured to obtain indication information included in a first paging message, where the indication information is related information used to instruct to receive the first paging message and/or receive a second paging message.

The determining module 602 is configured to determine the first paging message and/or the second paging message according to the indication information, where the first paging message is included in a first transport block, the second paging message is included in a second transport block, and the first transport block and the second transport block are different transport blocks that are separately transmitted.

In some embodiments of the present invention, the first paging message includes a paging user equipment UE sub-identity ID, multiple sub-IDs corresponding to same UE form a paging UE ID, and the paging UE sub-ID includes some information of the paging UE ID, and/or the second paging message includes another paging UE sub-ID that forms the paging UE ID.

In some embodiments of the present invention, a quantity of paging UE sub-IDs that form the paging UE ID is preset or indicated by signaling, and/or a quantity of paging UE sub-IDs that are included in the first paging message and that are associated with a paging UE ID is preset or indicated by signaling, and/or a quantity of paging UE sub-IDs that are included in the second paging message and that are associated with the paging UE ID is preset or indicated by signaling.

In some embodiments of the present invention, a length of a paging UE sub-ID that forms the paging UE ID is preset or indicated by signaling, and/or, a length of a paging UE sub-ID that is included in the first paging message and that is associated with a paging UE ID is preset or indicated by signaling, and/or a length of a paging UE sub-ID that is included in the second paging message and that is associated with the paging UE ID is preset or indicated by signaling.

In some embodiments of the present invention, the determining module 602 is further configured to: determine a format of the first paging message according to a predefinition, or receive signaling, and determine a format of the first paging message according to the received signaling, or determine a format of the first paging message according to an implicit indication.

In some embodiments of the present invention, the signaling is one or more of the indication information, system information, Radio Resource Control signaling, Media Access Control signaling, or physical layer signaling.

In some embodiments of the present invention, the indication information includes one or more of the following information: indication information of an update of system information, indication information of an earthquake and tsunami warning system, or indication information of a commercial mobile alert service.

In some embodiments of the present invention, the indication information includes setting information indicating a paging UE ID, where the paging UE ID setting information includes one or more of the following information: quantity indication information of an ID whose paging UE ID type is an international mobile subscriber identity IMSI, quantity indication information of an ID whose paging UE ID type is a temporary mobile subscriber identity S-TMSI, value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

In some embodiments of the present invention, the indication information includes one or more of the following information: size information of the second paging message, modulation information of the second paging message, encoding information of the second paging message, time resource information of the second paging message, frequency resource information of the second paging message, power setting information of the second paging message, paging UE ID type information included in the second paging message, paging UE ID quantity information included in the second paging message, or structure information of the second paging message.

In some embodiments of the present invention, the determining module 602 is specifically configured to determine, according to the first paging message or the indication information included in the first paging message, one or more of the following content: a transport block size of the second paging message, a structure of the second paging message, or whether the second paging message exists.

In some embodiments of the present invention, the determining module 602 is specifically configured to: if there is no paging UE sub-ID matched in the determined first paging message, stop receiving the second paging message, or if there is a paging UE sub-ID matched in the first paging message, receive the second paging message.

In some embodiments of the present invention, the second paging message includes indication information, where the indication information in the second paging message is used to indicate the second paging message and/or indicate a third paging message.

In some embodiments of the present invention, the determining module 602 is specifically configured to determine some paging UE IDs or a paging UE sub-ID by using time resource information and/or frequency resource information that are/is used for transmitting the first paging message.

It can be learnt from the description of the foregoing embodiment of the present invention, indication information included in a first paging message is first obtained, where the indication information is related information used to instruct to receive the first paging message and/or receive a second paging message, and the first paging message and/or the second paging message are/is determined according to the indication information, where the first paging message is included in a first transport block, the second paging message is included in a second transport block, and the first transport block and the second transport block are different transport blocks that are separately transmitted. When the indication information included in the first paging message indicates the second paging message, the second paging message is also sent. The first paging message and the second paging message are separately transmitted by using different transport blocks, and the first paging message that is first transmitted may be used to indicate the second paging message that is transmitted next. According to the first paging message that is first received, a terminal may receive the second paging message that is transmitted next. No control channel needs to be used to schedule a transport block, and a transport block size of a paging message can be changed flexibly. Therefore, relatively few network resources are occupied, detection of a control channel by user equipment is avoided, and detection power consumption of the user equipment is reduced.

An embodiment of the present invention further provides a computer storage medium. The computer storage medium stores a program, and the program performs some or all of steps described in the foregoing method embodiments.

Figure 7:
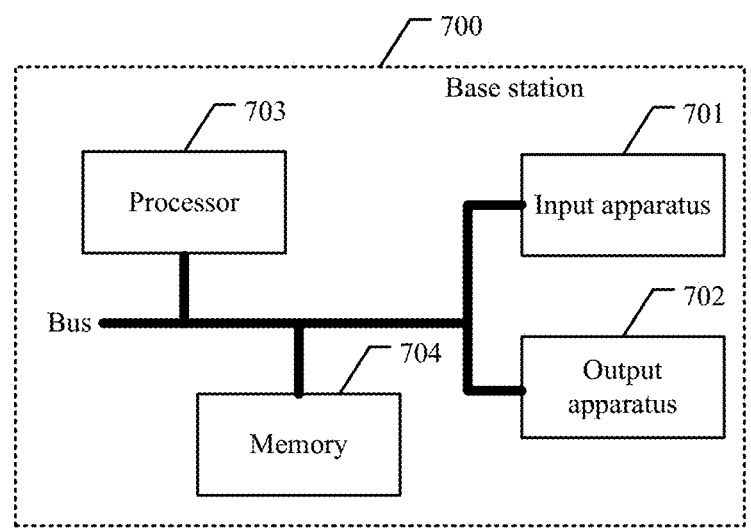
FIG. 7 is a schematic composition structure diagram of another base station according to an embodiment of the present invention.

The following describes another base station provided in an embodiment of the present invention. Referring to FIG. 7, the base station 700 includes: an input apparatus 701, an output apparatus 702, a processor 703, and a memory 704 (there may be one or more processors 703 in the base station 700, and FIG. 7 uses an example in which there is one processor). In some embodiments of the present invention, the input apparatus 701, the output apparatus 702, the processor 703, and the memory 704 may be connected by using a bus or in another manner, and FIG. 7 uses an example in which the connection is implemented by using a bus.

The processor 703 is configured to perform the paging message transmission method corresponding to FIG. 2.

Specifically, the processor 703 is configured to perform the following steps: determining indication information included in a first paging message, where the indication information is used to instruct user equipment UE to receive the first paging message and/or receive a second paging message, sending the first paging message including the indication information, where the first paging message is included in a first transport block, and sending the second paging message if the indication information instructs the user equipment to receive the second paging message, where the second paging message is included in a second transport block, and the second transport block and the first transport block are different transport blocks that are separately transmitted.

In some embodiments of the present invention, the first paging message stored in the memory 704 includes a paging UE sub-identity ID, multiple sub-IDs corresponding to same UE form a paging UE ID, and the paging UE sub-ID includes some information of the paging UE ID, and/or the second paging message includes another paging UE sub-ID that forms the paging UE ID.

In some embodiments of the present invention, a quantity, stored in the memory 704, of paging UE sub-IDs that form the paging UE ID is preset or indicated by signaling, and/or a quantity of paging UE sub-IDs that are included in the first paging message and that are associated with a paging UE ID is preset or indicated by signaling, and/or a quantity of paging UE sub-IDs that are included in the second paging message and that are associated with the paging UE ID is preset or indicated by signaling.

In some embodiments of the present invention, a length, stored in the memory 704, of a paging UE sub-ID that forms the paging UE ID is preset or indicated by signaling, and/or a length of a paging UE sub-ID that is included in the first paging message and that is associated with a paging UE ID is preset or indicated by signaling, and/or a length of a paging UE sub-ID that is included in the second paging message and that is associated with the paging UE ID is preset or indicated by signaling.

In some embodiments of the present invention, the processor 703 is further configured to perform the following step: determining a format of the first paging message according to a predefinition, or self-determining a format of the first paging message, and notifying a peer device of the determined format of the first paging message by using signaling or an implicit indication.

In some embodiments of the present invention, the signaling stored in the memory 704 is one or more of the indication information, system information, Radio Resource Control signaling, Media Access Control signaling, or physical layer signaling.

In some embodiments of the present invention, the indication information stored in the memory 704 includes one or more of the following information: indication information of an update of system information, indication information of an earthquake and tsunami warning system, or indication information of a commercial mobile alert service.

In some embodiments of the present invention, the indication information stored in the memory 704 includes setting information indicating a paging UE ID, where the paging UE ID setting information includes one or more of the following information: quantity indication information of an ID whose paging UE ID type is an international mobile subscriber identity IMSI, quantity indication information of an ID whose paging UE ID type is a temporary mobile subscriber identity S-TMSI, value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

In some embodiments of the present invention, the indication information stored in the memory 704 includes one or more of the following information: size information of the second paging message, modulation information of the second paging message, encoding information of the second paging message, time resource information of the second paging message, frequency resource information of the second paging message, power setting information of the second paging message, paging UE ID type information included in the second paging message, paging UE ID quantity information included in the second paging message, or structure information of the second paging message.

In some embodiments of the present invention, the second paging message stored in the memory 704 includes indication information, where the indication information in the second paging message is used to indicate the second paging message and/or indicate a third paging message.

In some embodiments of the present invention, time resource information and/or frequency resource information that are/is used for transmitting the first paging message and that are/is stored in the memory 704 are/is used to indicate some paging UE IDs or a paging UE sub-ID.

It can be learnt from the description of the foregoing embodiment of the present invention, indication information included in a first paging message is first obtained, where the indication information is related information used to instruct to receive the first paging message and/or receive a second paging message, and the first paging message and/or the second paging message are/is determined according to the indication information, where the first paging message is included in a first transport block, the second paging message is included in a second transport block, and the first transport block and the second transport block are different transport blocks that are separately transmitted. When the indication information included in the first paging message indicates the second paging message, the second paging message is also sent. The first paging message and the second paging message are separately transmitted by using different transport blocks, and the first paging message that is first transmitted may be used to indicate the second paging message that is transmitted next. According to the first paging message that is first received, a terminal may receive the second paging message that is transmitted next. No control channel needs to be used to schedule a transport block, and a transport block size of a paging message can be changed flexibly. Therefore, relatively few network resources are occupied, detection of a control channel by user equipment is avoided, and detection power consumption of the user equipment is reduced.

Figure 8:
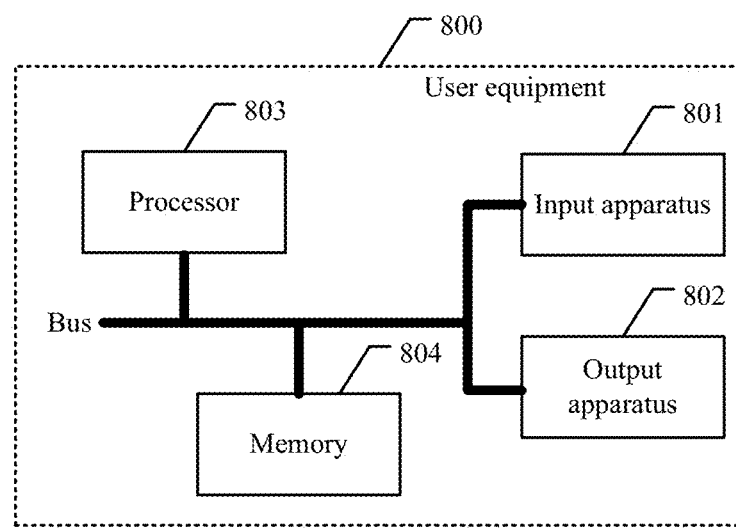
FIG. 8 is a schematic composition structure diagram of another user equipment according to an embodiment of the present invention.

The following describes another user equipment provided in an embodiment of the present invention. Referring to FIG. 8, the user equipment 800 includes: an input apparatus 801, an output apparatus 802, a processor 803, and a memory 804 (there may be one or more processors 803 in the user equipment 800, and FIG. 8 uses an example in which there is one processor). In some embodiments of the present invention, the input apparatus 801, the output apparatus 802, the processor 803, and the memory 804 may be connected by using a bus or in another manner, and FIG. 8 uses an example in which the connection is implemented by using a bus.

The processor 803 is configured to perform the paging message transmission method corresponding to FIG. 3.

Specifically, the processor 803 is configured to perform the following steps: obtaining indication information included in a first paging message, where the indication information is related information used to instruct to receive the first paging message and/or receive a second paging message, and determining the first paging message and/or the second paging message according to the indication information, where the first paging message is included in a first transport block, the second paging message is included in a second transport block, and the first transport block and the second transport block are different transport blocks that are separately transmitted.

In some embodiments of the present invention, the first paging message stored in the memory 804 includes a paging user equipment UE sub-identity ID, multiple sub-IDs corresponding to same UE form a paging UE ID, and the paging UE sub-ID includes some information of the paging UE ID, and/or the second paging message includes another paging UE sub-ID that forms the paging UE ID.

In some embodiments of the present invention, a quantity, stored in the memory 804, of paging UE sub-IDs that form the paging UE ID is preset or indicated by signaling, and/or a quantity of paging UE sub-IDs that are included in the first paging message and that are associated with a paging UE ID is preset or indicated by signaling, and/or a quantity of paging UE sub-IDs that are included in the second paging message and that are associated with the paging UE ID is preset or indicated by signaling.

In some embodiments of the present invention, a length, stored in the memory 804, of a paging UE sub-ID that forms the paging UE ID is preset or indicated by signaling, and/or a length of a paging UE sub-ID that is included in the first paging message and that is associated with a paging UE ID is preset or indicated by signaling, and/or a length of a paging UE sub-ID that is included in the second paging message and that is associated with the paging UE ID is preset or indicated by signaling.

In some embodiments of the present invention, the processor 803 is further configured to perform the following step: determining a format of the first paging message according to a predefinition, or receiving signaling, and determining a format of the first paging message according to the received signaling, or determining a format of the first paging message according to an implicit indication.

In some embodiments of the present invention, the signaling stored in the memory 804 is one or more of the indication information, system information, Radio Resource Control signaling, Media Access Control signaling, or physical layer signaling.

In some embodiments of the present invention, the indication information stored in the memory 804 includes one or more of the following information: indication information of an update of system information, indication information of an earthquake and tsunami warning system, or indication information of a commercial mobile alert service.

In some embodiments of the present invention, the indication information stored in the memory 804 includes setting information indicating a paging UE ID, where the paging UE ID setting information includes one or more of the following information: quantity indication information of an ID whose paging UE ID type is an international mobile subscriber identity IMSI, quantity indication information of an ID whose paging UE ID type is a temporary mobile subscriber identity S-TMSI, value indication information of a paging UE sub-ID whose type is an IMSI, value indication information of a paging UE sub-ID whose type is an S-TMSI, location indication information of a paging UE sub-ID whose type is an IMSI, location indication information of a paging UE sub-ID whose type is an S-TMSI, or indication information of a paging UE ID type.

In some embodiments of the present invention, the indication information stored in the memory 804 includes one or more of the following information: size information of the second paging message, modulation information of the second paging message, encoding information of the second paging message, time resource information of the second paging message, frequency resource information of the second paging message, power setting information of the second paging message, paging UE ID type information included in the second paging message, paging UE ID quantity information included in the second paging message, or structure information of the second paging message.

In some embodiments of the present invention, the processor 803 is specifically configured to perform the following step: determining, according to the first paging message or the indication information included in the first paging message, one or more of the following content: a transport block size of the second paging message, a structure of the second paging message, or whether the second paging message exists.

In some embodiments of the present invention, the processor 803 is specifically configured to perform the following step: if there is no paging UE sub-ID matched in the determined first paging message, stopping receiving the second paging message, or if there is a paging UE sub-ID matched in the first paging message, receiving the second paging message.

In some embodiments of the present invention, the second paging message stored in the memory 804 includes indication information, where the indication information in the second paging message is used to indicate the second paging message and/or indicate a third paging message.

In some embodiments of the present invention, the processor 803 is specifically configured to perform the following step: determining some paging UE IDs or a paging UE sub-ID by using time resource information and/or frequency resource information that are/is used for transmitting the first paging message.

It can be learnt from the description of the foregoing embodiment of the present invention, indication information included in a first paging message is first obtained, where the indication information is related information used to instruct to receive the first paging message and/or receive a second paging message, and the first paging message and/or the second paging message are/is determined according to the indication information, where the first paging message is included in a first transport block, the second paging message is included in a second transport block, and the first transport block and the second transport block are different transport blocks that are separately transmitted. When the indication information included in the first paging message indicates the second paging message, the second paging message is also sent. The first paging message and the second paging message are separately transmitted by using different transport blocks, and the first paging message that is first transmitted may be used to indicate the second paging message that is transmitted next. According to the first paging message that is first received, a terminal may receive the second paging message that is transmitted next. No control channel needs to be used to schedule a transport block, and a transport block size of a paging message can be changed flexibly. Therefore, relatively few network resources are occupied, detection of a control channel by user equipment is avoided, and detection power consumption of the user equipment is reduced.

In addition, it should be noted that the described apparatus embodiments are merely examples. The units described as separate parts may or may not be physically separate. Parts displayed as units may or may not be physical units, and may be located in one position or distributed on a plurality of network units. Some or all of the modules may be selected according to actual needs to achieve the objectives of the solutions in the embodiments. In addition, in the accompanying drawings of the apparatus embodiments provided in the present invention, connection relationships between modules indicate that the modules have communication connections with each other, which may be specifically implemented as one or more communications buses or signal cables. Persons of ordinary skill in the art may understand and implement the embodiments of the present invention without creative efforts.

Based on the descriptions of the foregoing implementations, persons skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to implement a same function may be of various forms, for example, in a form of an analog circuit, a digital circuit, or a dedicated circuit. However, as for the present invention, a software program implementation is a better implementation in most cases. Based on such an understanding, the technical solutions in the present invention essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of the present invention.

In conclusion, the foregoing embodiments are merely intended to describe the technical solutions in the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present invention.

What is claimed is:

1. A paging message sending method, comprising:
    determining indication information comprised in a first message, wherein the indication information indicates whether a paging message exists, wherein the indication information indicates modulation and coding information of the paging message and time resource information of the paging message, wherein three bits in the indication information indicate an international mobile subscriber identity (IMSI) setting, and wherein a first bit of the three bits indicates a value indication of a paging UE sub-ID whose type is an IMSI, and wherein second bits of the three bits, other than the first bit, indicate a quantity of a paging UE ID whose type is an IMSI;
    sending the first message comprising the indication information to a user equipment (UE) using physical layer signaling, wherein the first message is in a first transport block; and
    sending the paging message to the UE in case of the indication information indicating that the paging message exists, wherein the paging message is in a second transport block, and wherein the second transport block and the first transport block are different transport blocks.

2. The method according to claim 1, further comprising:
    determining a format of the first message, and notifying the UE of the determined format of the first message using the indication information.

3. The method according to claim 1, wherein the indication information further comprises frequency resource information of the paging message.

4. The method according to claim 1, wherein the indication information further comprises one or more of indication information of an update of system information, indication information of an earthquake and tsunami warning system (ETWS), or indication information of a commercial mobile alert service (CMAS).

5. A paging message receiving method comprising:
    obtaining indication information comprised in a first message, wherein the indication information indicates whether a paging message exists, wherein the indication information indicates modulation and coding information of the paging message and time resource information of the paging message, wherein three bits in the indication information indicate an international mobile subscriber identity (IMSI) setting, and wherein a first bit of the three bits indicates a value indication of a paging UE sub-ID whose type is an IMSI, and wherein second bits of the three bits, other than the first bit, indicate a quantity of a paging UE ID whose type is an IMSI;
    determining, according to the indication information, whether the paging message exists, wherein the first message is in a first transport block, wherein the paging message is comprised in a second transport block, and wherein the first transport block and the second transport block are different transport blocks; and
    receiving the paging message in case of the indication information indicating the paging message exists, wherein the indication information comprises modulation and coding information of the paging message, and further comprises time resource information of the paging message.

6. The method according to claim 5, further comprising:
    determining a format of the first message according to the indication information.

7. The method according to claim 5, wherein the indication information further comprises frequency resource information of the paging message.

8. The method according to claim 5, wherein a size of the first message is a quantity of bits of the first message.

9. The method according to claim 5, wherein the first message has a format indicated by the indication information and that is one of a first format or a second format different from the first format, and wherein a size of the first message indicated by the first format is the same as a size indicated by the second format.

10. The method according to claim 5, wherein the indication information further comprises one or more of indication information of an update of system information, indication information of an earthquake and tsunami warning system (ETWS), or indication information of a commercial mobile alert service (CMAS).

11. A base station comprising:
a transmitter;
a processor;
a memory storing a program to be executed in the processor, the program comprising instructions for:
determining indication information comprised in a first message, wherein the indication information indicates whether a paging message exists, wherein the indication information indicates modulation and coding information of the paging message and time resource information of the paging message, wherein three bits in the indication information indicate an international mobile subscriber identity (IMSI) setting, and wherein a first bit of the three bits indicates a value indication of a paging UE sub-ID whose type is an IMSI, and wherein second bits of the three bits, other than the first bit, indicate a quantity of a paging UE ID whose type is an IMSI;
causing the transmitter to send the first message comprising the indication information to a user equipment (UE) using physical layer signaling, wherein the first message is in a first transport block; and
causing the transmitter to send the paging message to the UE in case of the indication information indicating that the paging message exists, wherein the paging message is in a second transport block, and wherein the second transport block and the first transport block are different transport blocks.

12. The base station according to claim 11, wherein the program comprises further instructions for:
determining a format of the first message; and
causing the transmitter to notify the UE of the determined format of the first message using the indication information.

13. The base station according to claim 11, wherein the indication information further comprises frequency resource information of the paging message.

14. The base station according to claim 11, wherein the indication information further comprises one or more of indication information of an update of system information, indication information of an earthquake and tsunami warning system (ETWS), or indication information of a commercial mobile alert service (CMAS).

15. An apparatus comprising:
a receiver
a processor;
a memory storing a program to be executed in the processor, the program comprising instructions for:
obtaining, through the receiver, indication information comprised in a first message, wherein the indication information indicates whether a paging message exists, wherein the indication information indicates modulation and coding information of the paging message and time resource information of the paging message, wherein the indication information is physical layer signaling, wherein three bits in the indication information indicate an international mobile subscriber identity (IMSI) setting, and wherein a first bit of the three bits indicates a value indication of a paging UE sub-ID whose type is an IMSI, and wherein second bits of the three bits, other than the first bit, indicate a quantity of a paging UE ID whose type is an IMSI;
determining, according to the indication information, whether the paging message exists, wherein the first message is in a first transport block, wherein the paging message is in a second transport block, and wherein the first transport block and the second transport block are different transport blocks; and
receiving, through the receiver, in case of the indication information indicating that the paging message exists, the paging message.

16. The apparatus according to claim 15, wherein the program further includes instructions for determining a format of the first message according to the indication information.

17. The apparatus according to claim 15, wherein the indication information further comprises frequency resource information of the paging message.

18. The apparatus according to claim 15, wherein a size of the first message is a quantity of bits of the first message.

19. The apparatus according to claim 15, wherein the first message has a format indicated by the indication information and that is one of a first format or a second format different from the first format, and wherein a size of the first message indicated by the first format is the same as a size indicated by the second format.

20. The apparatus according to claim 15, wherein the indication information further comprises one or more of indication information of an update of system information, indication information of an earthquake and tsunami warning system (ETWS), or indication information of a commercial mobile alert service (CMAS).

* * * * *

UNITED STATES PATENT AND TRADEMARK OFFICE
CERTIFICATE OF CORRECTION

| | |
|---|---|
| PATENT NO. | : 12,376,072 B2 |
| APPLICATION NO. | : 17/081842 |
| DATED | : July 29, 2025 |
| INVENTOR(S) | : Zheng Yu |

Page 1 of 1

It is certified that error appears in the above-identified patent and that said Letters Patent is hereby corrected as shown below:

In the Specification

In Column 16, Line 66, after "reduced." delete "[moo]".

In Column 16, Lines 66-67, delete "In this embodiment of the present invention, when sending the first paging message to the UE," and insert the same from Line 67 as a new paragraph/point.

Signed and Sealed this
Second Day of September, 2025

Coke Morgan Stewart
*Acting Director of the United States Patent and Trademark Office*